(12) United States Patent
Oketani et al.

(10) Patent No.: US 11,218,260 B1
(45) Date of Patent: Jan. 4, 2022

(54) COMMUNICATION SYSTEM, BASE STATION, MOBILE STATION, METHOD FOR MOBILE STATION, AND METHOD FOR COMMUNICATION SYSTEM

(71) Applicant: NEC Corporation, Tokyo (JP)

(72) Inventors: Kengo Oketani, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/356,779

(22) Filed: Jun. 24, 2021

Related U.S. Application Data

(63) Continuation of application No. 16/655,493, filed on Oct. 17, 2019, now Pat. No. 11,082,175, which is a
(Continued)

(30) Foreign Application Priority Data

Apr. 28, 2006 (JP) ................. 2006-125577

(51) Int. Cl.
*H04W 72/04* (2009.01)
*H04L 5/00* (2006.01)
*H04J 13/00* (2011.01)
*H04W 28/04* (2009.01)
*H04J 13/16* (2011.01)

(52) U.S. Cl.
CPC ........ *H04L 5/0044* (2013.01); *H04J 13/0059* (2013.01); *H04J 13/0062* (2013.01); *H04J 13/16* (2013.01); *H04L 5/0048* (2013.01); *H04W 28/04* (2013.01); *H04W 72/042* (2013.01); *H04W 72/0406* (2013.01); *H04W 72/0446* (2013.01);
(Continued)

(58) Field of Classification Search
CPC ... H04L 5/0007; H04L 5/0044; H04L 5/0048; H04J 13/0059; H04J 13/0062; H04J 13/16; H04W 28/04; H04W 72/04; H04W 72/0406; H04W 72/042; H04W 72/0446; H04B 2201/70701
See application file for complete search history.

(56) References Cited

U.S. PATENT DOCUMENTS 7,505,842 B2   3/2009   Luh
7,508,842 B2   3/2009   Baum et al.
(Continued)

FOREIGN PATENT DOCUMENTS

CN    1527513 A    9/2004
CN    1553621 A    12/2004
(Continued)

OTHER PUBLICATIONS

"Innovation: Extending of Orthogonality for More Users," slide as part of U.S. Appl. No. 60/762,071, 1 page (Jan. 25, 2006).
(Continued)

*Primary Examiner* — Brian P Cox
(74) *Attorney, Agent, or Firm* — Wilmer Cutler Pickering Hale and Dorr LLP

(57) ABSTRACT

A device and method is which plurality of Zadoff-Chu sequences is allocated to a frame, a value of a parameter in the Zadoff-Chu sequence is different among the plurality of Zadoff-Chu sequences, and the Zadoff-Chu sequence allocated to the frame is different among a plurality of cells.

20 Claims, 19 Drawing Sheets

Related U.S. Application Data continuation of application No. 16/299,868, filed on Mar. 12, 2019, now Pat. No. 10,505,684, which is a continuation of application No. 15/696,790, filed on Sep. 6, 2017, now Pat. No. 10,313,072, which is a continuation of application No. 15/075,947, filed on Mar. 21, 2016, now Pat. No. 9,787,421, which is a continuation of application No. 13/915,256, filed on Jun. 11, 2013, now Pat. No. 9,402,246, which is a continuation of application No. 13/572,955, filed on Aug. 13, 2012, now Pat. No. 8,509,262, which is a continuation of application No. 13/414,530, filed on Mar. 7, 2012, now Pat. No. 8,363,615, which is a continuation of application No. 11/790,599, filed on Apr. 26, 2007, now Pat. No. 8,165,159.

(52) U.S. Cl.
CPC .. *H04B 2201/70701* (2013.01); *H04L 5/0007* (2013.01); *H04W 72/04* (2013.01)

(56) References Cited

U.S. PATENT DOCUMENTS

| | | | |
|---|---|---|---|
| 7,539,263 | B2 | 5/2009 | Jung et al. |
| 8,121,105 | B2 | 2/2012 | Inoue et al. |
| 8,165,159 | B2 | 4/2012 | Oketani et al. |
| 8,363,615 | B2 | 1/2013 | Oketani et al. |
| 8,509,262 | B2 | 8/2013 | Oketani et al. |
| 9,402,246 | B2 | 7/2016 | Oketani et al. |
| 9,515,762 | B2 | 12/2016 | Oketani et al. |
| 9,787,421 | B2 | 10/2017 | Oketani et al. |
| 10,313,072 | B2 | 6/2019 | Oketani et al. |
| 10,505,684 | B2 | 12/2019 | Oketani et al. |
| 2002/0044619 | A1 | 4/2002 | Kobori |
| 2004/0109432 | A1 | 6/2004 | Laroia et al. |
| 2005/0170783 | A1 | 8/2005 | Krishnan et al. |
| 2006/0018251 | A1 | 1/2006 | Park et al. |
| 2006/0028976 | A1 | 2/2006 | Park et al. |
| 2006/0039343 | A1 | 2/2006 | Anderson et al. |
| 2006/0050799 | A1 | 3/2006 | Hou et al. |
| 2006/0056528 | A1 | 3/2006 | Jung et al. |
| 2007/0041311 | A1 | 2/2007 | Baum et al. |
| 2007/0165588 | A1* | 7/2007 | McCoy ................ H04J 1/12 370/344 |
| 2007/0183386 | A1 | 8/2007 | Muharemovic et al. |
| 2008/0299984 | A1 | 12/2008 | Shimomura et al. |
| 2009/0147688 | A1 | 6/2009 | Matsumoto et al. |
| 2012/0113931 | A1 | 5/2012 | Inoue et al. |

FOREIGN PATENT DOCUMENTS

| | | |
|---|---|---|
| CN | 1747461 A | 3/2006 |
| DE | 10341546 A1 | 1/2005 |
| EP | 1635481 A2 | 3/2006 |
| JP | 2772292 B2 | 7/1998 |
| JP | H11-046179 A | 2/1999 |
| JP | 2000-236284 A | 8/2000 |
| JP | 2002-124936 A | 4/2002 |
| JP | 2003-244763 A | 8/2003 |
| JP | 2005-198232 A | 7/2005 |
| JP | 2006-125577 A | 5/2006 |
| JP | 2009-535936 A | 10/2009 |
| JP | 4736934 B2 | 7/2011 |
| JP | 5131364 B2 | 1/2013 |
| JP | 5348281 B2 | 11/2013 |
| JP | 5376080 B2 | 12/2013 |
| JP | 5644902 B2 | 12/2014 |
| KR | 20050099632 A | 10/2005 |
| KR | 20060023863 A | 3/2006 |
| WO | WO-2004/077728 A2 | 9/2004 |
| WO | WO-2005/015797 A1 | 2/2005 |
| WO | WO-2005/107121 A1 | 11/2005 |
| WO | WO-2006/015988 A1 | 2/2006 |
| WO | WO-2007/021370 A1 | 2/2007 |
| WO | WO-2007/086149 A1 | 8/2007 |
| WO | WO-2007/122828 A1 | 11/2007 |
| WO | WO-2007/125910 A1 | 11/2007 |

OTHER PUBLICATIONS

"Physical Layer Aspects for Evolved UTRA," 3GPP TR25.814 v 1.2.2, Chapter 9.1 (2006).

3GPP TSG RAN WG1#44, R1-060373: Comparison of Proposed Pilot Structures For SC-OFDMA, Agenda Item 13.2.2.2, Denver, Colorado, 10 total pages (Feb. 13-17, 2006).

3GPP TSG RAN WG1#44bis, Athens, Greece, Mar. 27-31, 2006, R1-060925: Comparison of Proposed Uplink Pilot Structures For SC-OFDMA.

Chinese Office Action dated Sep. 22, 2011 with an English-Language translation thereof.

Chinese Office Action issued by the State Intellectual Property Office of the People's Republic of China for Application No. 201210028651.2 dated Mar. 4, 2014, with English translation (10 pages).

Ericsson, "Uplink reference signals," No. RI-063128, pp. 1-5, XP002494361, TSG-RAN WG1 meeting 47, Riga, Latvia (Nov. 6, 2006).

European Search Report dated Sep. 28, 2009.

Fazel, K. and Keiser, S., "Multi-Carrier and Spread Spectrum Systems," John Wiley and Sons (2003).

Freescale Semiconductor, Inc., Considerations on SC-FDMA Pilot Design, 3GPP TSG-RAN WGI Ad hoc on LTE, Jan. 25, 2006, Tdoc RI-060153, URL: htt12://www.3g1212.orfilft12/tsg ran/WGI RLI/TSGRI AH/LTE AH Jan.-6/Docs/RI-060153.zip.

Huawei, "Uplink pilot for SC-FDMA," 3GPP TSG RAN WG1 #42bis, R1-051191, Agenda Item 8.2, San Diego, US, 5 pages (Oct. 10-14, 2005).

Japanese Notification of Reasons for Refusal issued in corresponding Japanese Application No. 2015-127438, dated Apr. 19, 2016, 8 pages.

Japanese Notification of Reasons for Refusal issued in corresponding Japanese Patent Application No. 2016-120768, 7 pages.

Japanese Notification of Reasons for Refusal issued in Japanese Patent Application No. 2016-161304, dated Jun. 27, 2017, 10 pages.

Japanese Office Action dated Apr. 23, 2013, with partial English-language translation.

Japanese Office Action dated Jan. 11, 2011 with partial English language translation.

Japanese Office Action dated Jul. 17, 2012, with partial Enqlish-lanquaqe translation.

Japanese Office Action issued by the Japan Patent Office for Applicaiton No. 2013-135688 dated May 7, 2014 (2 pages).

Japanese Office Action issued by the Japan Patent Office for Application No. 2014-138541 dated Apr. 14, 2015 (3 pages).

Japanese Office Action issued by the Japan Patent Office for Application No. 2014-215104 dated Apr. 28, 2015 (9 pages).

Japanese Office Action issued by the Japan Patent Office for Japanese Application No. 2016-120768 dated Nov. 14, 2017 (5 pages).

Japanese Office Action issued by the Japan Patent Office for Japanese Application No. 2017-181105 dated Jul. 24, 2018 (9 pages).

Korean Office Action dated Jul. 29, 2008 with partial English translation.

InterDigital Communications Corporation, Uplink MIMO SC-FDMA with Adaptive Modulation and Coding, 3GPP TSG RAN WG1#44bis, R1-061082, Mar. 31, 2006.

Motorola "EUTRA SC-FDMSA Uplink Pilot/Reference Signal Design & TP", 3GPP TSG RAN1#44, R1-060390, Denver, USA, Feb. 13-Feb. 17, 2006, 6 pages.

Motorola, "Performance Comparison of Pilot/Reference Signal Structures for E-UTRA Uplink SC-FDMA," 3GPP TSG RAN WG1 #44bis, R1-060879, Athens, Greece, 15 pages (Mar. 27-31, 2006).

(56) References Cited

OTHER PUBLICATIONS

NEC Group "Performance of CAZAC Pilot Sequence for D-FDMA ND L-FDMA with Frequency Hopping for EUTRA Uplink", TSG-RAN WG1#44, R1-060604, Denver, USA, Feb. 13-17, 2006, 9 pages.

NEC Group, "Consideration on uplink pilot design using CAZAC," 3GPP TSG RAN WG1 Meeting #44bis, R1-060831, Agenda Item 10.2.1, Athens, Greece, 5 pages (Mar. 27-31, 2006).

NEC Group, "Considerations on uplink pilot design using CAZACc," TSG-RAN WG 1 Ad hoc Helsinki, Finland Jan. 23-25, 2006, XP002545599.

Panasonic, "SINR improvement of Data symbols by combining with CP in SC-FDMA," TSG-RAN WG1 #42, R1-050830, Agenda Item 10.3, London, UK, 6 pages (Aug.29-Sep. 2, 2005).

Texas Instruments "Text Proposal on Uplink Reference Signal Structure", 3GPP TSG-RAN WG1 LTE Meeting, R1-060374, Denver, USA, Jan. 13-17, 2006, 4 pages.

Texas Instruments, "On Allocation of Uplink Pilot Sub-Channels in EUTRA SC-FDMA," 3GPP TSG RAN WG1 Ad Hoc on LTE, R1-050822, Agenda Item 10.3, London, UK, 7 pages (Aug. 29-Sep. 2, 2005).

Texas Instruments, "On Uplink Pilot in EUTRA SC-FDMA," 3GPP TSG-RAN WG 1 Ad hoc on LTE, San Diego USA, Oct. 10-14, 2005, XP002545600.

Texas Instruments: "On Uplink Pilot in EUTRA SC-FDMA", 3GPP TSG RAN WG 1 Ad hoc on LTE, Oct. 14, 2005, RI-051062, URL: http://www.3gpp.org/ftp/tsg_ran/WG 1 _ RL 1/TRGR 1 42bis/Docs? RI-05 I 062.zip.

Toshiba Research Europe Ltd, "Design of uplink reference signals", 3GPP TSG RAN WG1 Meeting #44 bis R1-060965, Mar. 27-31, 2006.

Motorola, "Performance Comparison of Pilot/Reference Signal Structures for E-UTRA Uplink SC-FDMA" 3GPP TSG RAN WG1 LTE Ad Hoc, R1-060027, Jan 23-Jan. 25, 2006, pp. 1-10.

Motorola, "EUTRA SC-FDMA Uplink Pilot/Reference Signal Design & TP", 3GPP TSG RAN WG1 #44bis, R1-060878, Mar. 27-Mar. 31, 2006, pp. 1-5.

Texas Instruments, "Boosting the Uplink Pilot Transmission Power for Higher Mobility UEs", 3GPP TSG-RAN WG1 Meeting #44bis, R1-060924, Mar. 27-31, 2006.

NTT DoCoMo, NEC, Sharp, "Orthogonal Pilot Channel in the Same Node Bin Evolved UTRA Uplink", 3GPP Tsg Ran WG1 #42 on Lte, R1-050851, Aug. 29-Sep. 2, 2005, pp. 1-9.

\* cited by examiner

SEVEN CELL REPEATING PATTERN

FIG. 5

ORIGINAL PILOT SEQUENCE
(NUMBER OF CELLS = K) : {$C\_1$, $C\_2$, $C\_3$, $C\_4$, ......, $C\_(2K-1)$, $C\_2K$}

|       | CELL #1 | CELL #2 | CELL #3 | CELL #4 | .... | CELL #(K-1) | CELL #K |
|-------|---------|---------|---------|---------|------|-------------|---------|
| SB #1 | $C\_1$  | $C\_3$  | $C\_5$  | $C\_7$  | .... | $C\_(2K-3)$ | $C\_(2K-1)$ |
| SB #2 | $C\_2$  | $C\_4$  | $C\_6$  | $C\_8$  | .... | $C\_(2K-2)$ | $C\_2K$ |

※ ALLOCATION OF PILOT SEQUENCE TO EACH CELL
AND EACH PILOT BLOCK (SB)

FIG. 10

ORIGINAL PILOT SEQUENCE
(NUMBER OF SEQUENCES = K) : {C_1, C_2, C_3, C_4, ......, C_(K-1), C_K}

| | CELL #1 | CELL #2 | CELL #3 | CELL #4 | ..... | CELL #(K-1) | CELL #K |
|---|---|---|---|---|---|---|---|
| SB #1 | C_1 | C_2 | C_3 | C_4 | ..... | C_(K-1) | C_K |
| SB #2 | C_2 | C_1 | C_4 | C_3 | ..... | C_K | C_(K-1) |

※ ALLOCATION OF PILOT SEQUENCE TO EACH CELL AND EACH PILOT BLOCK (SB)

BLOCK ERROR RATE FOR Eb/No (SIGNAL ENERGY FOR ONE BIT AND NOISE-TO-POWER DENSITY RATIO)

FIG. 15A

IF PILOT SEQUENCES OF SB #1 AND SB #2 ARE NOT CHANGED
TABLE #1

|  | PILOT SEQUENCE ALLOCATION TO EACH SB | |
|---|---|---|
|  | SB#1 | SB#2 |
| SELF-CELL USER | k=1 | k=2 |
| OTHER CELL USER (INTERFERENCE USER) | k=1 | k=2 |

FIG. 15B

IF PILOT SEQUENCES OF SB #1 AND SB #2 ARE CHANGED
TABLE #2

|  | PILOT SEQUENCE ALLOCATION TO EACH SB | |
|---|---|---|
|  | SB#1 | SB#2 |
| SELF-CELL USER | k=1 | k=2 |
| OTHER CELL USER (INTERFERENCE USER) | k=2 | k=3 |

FIG. 15C

IF PILOT SEQUENCES OF SB #1 AND SB #2 ARE CHANGED
(OTHER EXAMPLE 1)
TABLE #3

|  | PILOT SEQUENCE ALLOCATION TO EACH SB | |
|---|---|---|
|  | SB#1 | SB#2 |
| SELF-CELL USER | k=1 | k=2 |
| OTHER CELL USER (INTERFERENCE USER) | k=2 | k=1 |

FIG. 16A

IF PILOT SEQUENCES OF SB #1 AND SB #2 ARE CHANGED
(OTHER EXAMPLE 2)

TABLE #4

|  | PILOT SEQUENCE ALLOCATION TO EACH SB | |
| --- | --- | --- |
|  | SB#1 | SB#2 |
| SELF-CELL USER | $k=1$ | $k=3$ |
| OTHER CELL USER (INTERFERENCE USER) | $k=2$ | $k=4$ |

FIG. 16B

IF PILOT SEQUENCES OF SB #1 AND SB #2 ARE CHANGED
(OTHER EXAMPLE 3)

TABLE #5

|  | PILOT SEQUENCE ALLOCATION TO EACH SB | |
| --- | --- | --- |
|  | SB#1 | SB#2 |
| SELF-CELL USER | $k=1$ | $k=1$ |
| OTHER CELL USER (INTERFERENCE USER) | $k=2$ | $k=1$ |

FIG. 16C

IF PILOT SEQUENCES OF SB #1 AND SB #2 ARE CHANGED
(OTHER EXAMPLE 4)

TABLE #6

|  | PILOT SEQUENCE ALLOCATION TO EACH SB | |
| --- | --- | --- |
|  | SB#1 | SB#2 |
| SELF-CELL USER | $k=1$ | $k=1$ |
| OTHER CELL USER (INTERFERENCE USER) | $k=2$ | $k=3$ |

FIG. 17

Simulation Parameters

| Ttansmission Bandwidth | 5 MHz |
|---|---|
| Channel Estimation | Real |
| Modulation | 16QAM |
| sub - frame format | 25.814 v0.5.0 Table 9.1.1-1 '5MHz' case |
| FEC ( forward error correction ) | Rate 1/2 Turbo encoding (TURBO CODE, RATE 1/2) |
| Channel model | TU with 6 paths, type (1) ( from [∗] ← REFERENCE IS SHOWN BELOW TABLE ) |
| Doppler rate | 5.56 Hz ( 3 km / h @2.0 GHz ) |
| Number of receive antennas | 2 |
| TTI duration | 0.5ms |
| Transport Block Size ( including CRC ) | 1716 bits |
| Data Multiplexing | Localized FDM |
| Pilot Multiplexing | Distributed - FDM pilot [1] |
| SRF ( Symbol Repetition Factor ) | 4 |

[∗] 3GPP TS 45.005 V5.4.0 ( 2002-06 )

FIG. 18

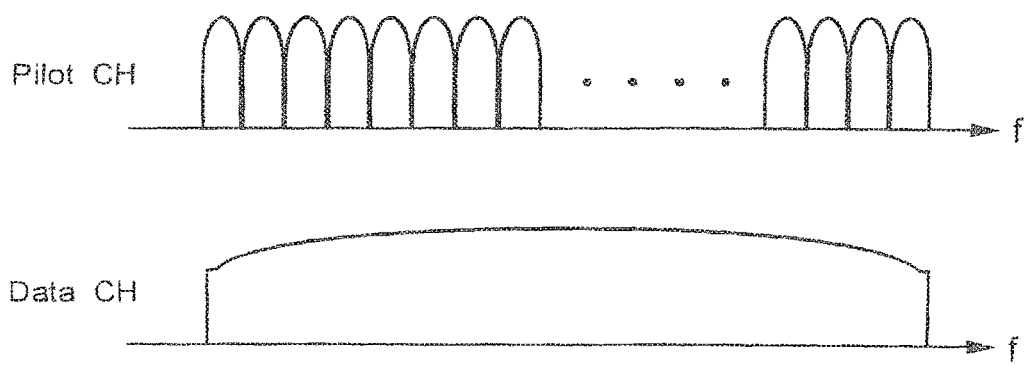

MULTIPLEXING OF Pilot CH AND Data CH
( WHERE FDM pilot AND SRF ( Symbol Repetition Factor = 4 ))

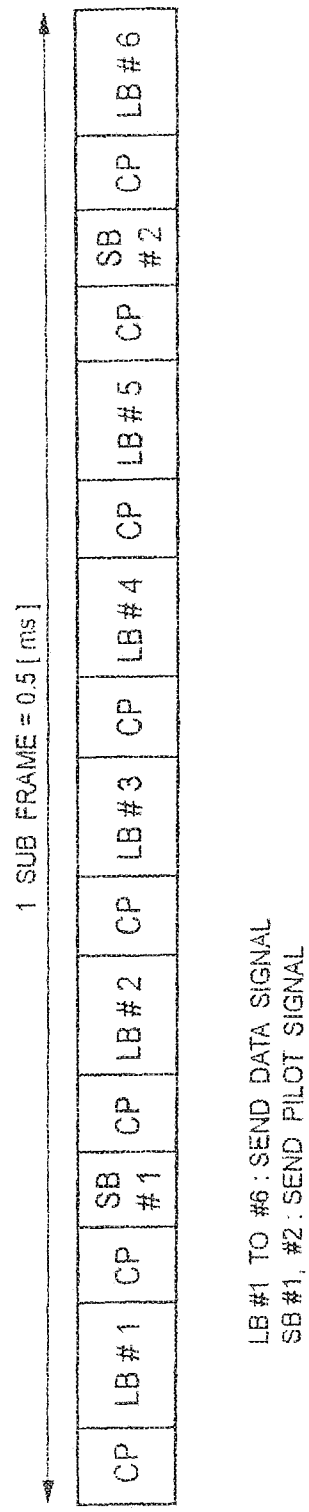

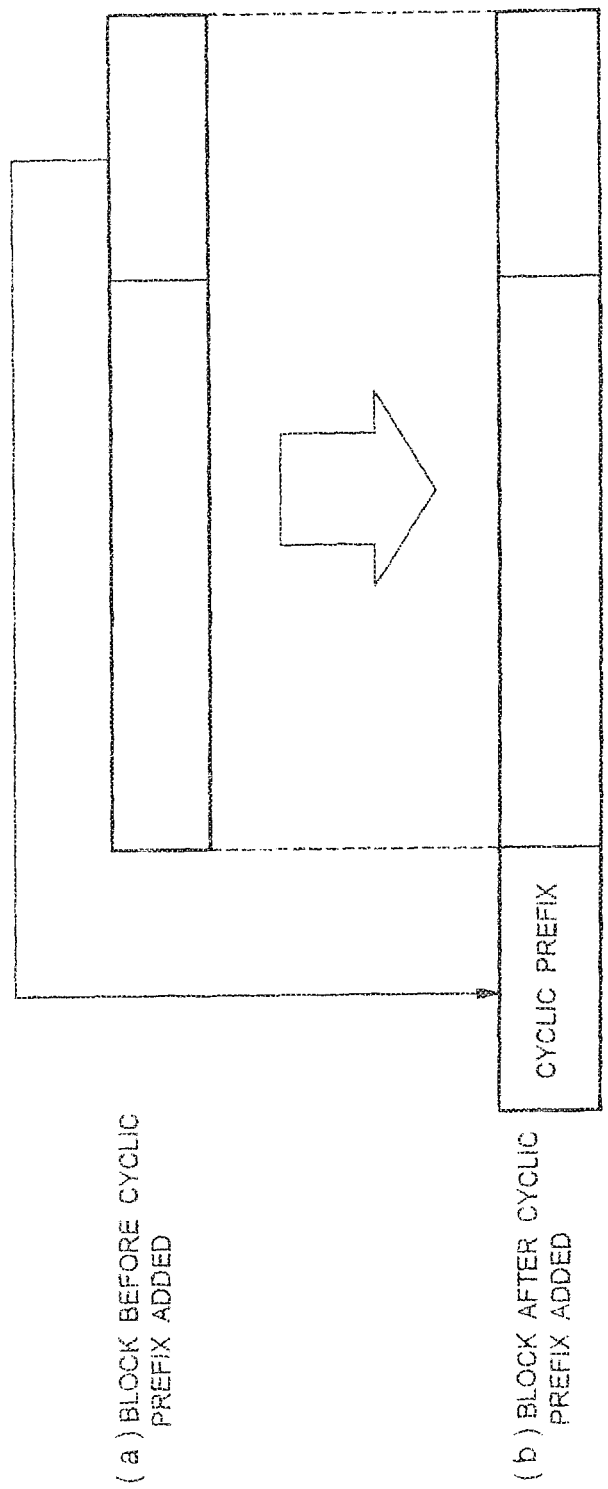

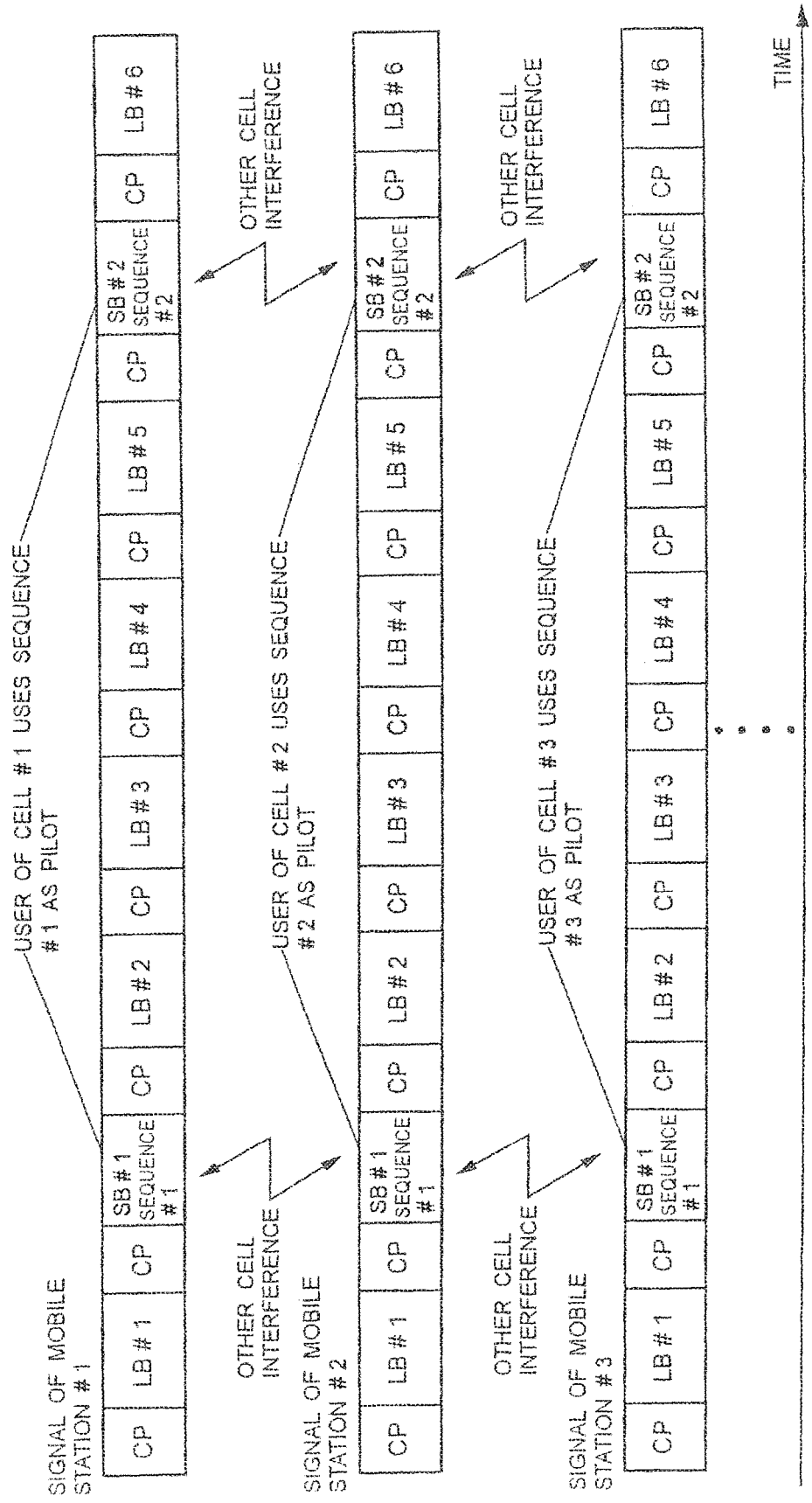

COMMUNICATION SYSTEM, BASE STATION, MOBILE STATION, METHOD FOR MOBILE STATION, AND METHOD FOR COMMUNICATION SYSTEM

CROSS-REFERENCE TO RELATED APPLICATIONS

This Application is a Continuation of prior application Ser. No. 16/655,493, filed on Oct. 17, 2019, which is a Continuation of prior application Ser. No. 16/299,868, filed on Mar. 12, 2019 (now U.S. Pat. No. 10,505,684), which is a Continuation of prior application Ser. No. 15/696,790, filed on Sep. 6, 2017 (now U.S. Pat. No. 10,313,072), which is a Continuation of prior application Ser. No. 15/075,947, filed Mar. 21, 2016 (now U.S. Pat. No. 9,787,421), which is a Continuation of prior application Ser. No. 13/915,256, filed Jun. 11, 2013 (now U.S. Pat. No. 9,402,246), which is a Continuation of prior application Ser. No. 13/572,955, filed on Aug. 13, 2012 (now U.S. Pat. No. 8,509,262), which is a Continuation of prior application Ser. No. 13/414,530, filed on Mar. 7, 2012 (now U.S. Pat. No. 8,363,615), which is a Continuation of prior application Ser. No. 11/790,599, filed on Apr. 26, 2007 (now U.S. Pat. No. 8,165,159), which claims the benefit of Japanese Application No. 2006-125577, filed Apr. 28, 2006. The disclosures of each of the aforementioned applications are incorporated herein by reference for all purposes.

BACKGROUND OF THE INVENTION

Field of the Invention

The present invention relates to a wireless communication system, a pilot sequence allocation apparatus and a method for allocating pilot sequence used for the system and the apparatus and a mobile station used in the method, and more specifically to the allocation of pilot sequence in a single carrier transmission system used in a wireless accessing method.

Description of the Prior Art

As an uplink wireless accessing method in the wireless communication system of the next generation, a single carrier transmission method is effective (refer to, for example, a Non-Patent document 1, "Physical Layer Aspects for Evolved UTRA" (3GPP TR25.814 v1.2.2 (2006-3), Chapter 9.1.). The configuration of a frame format used in the singe carrier transmission method proposed in the Non-Patent document 1 is shown in FIG. 19.

In FIG. 19, a data signal is supposed to be sent in six LB (Long Block) #1 to #6 in a sub frame and a pilot signal is supposed to be sent in two SB (Short Block) #1, #2.

CP (Cyclic Prefix) is added to the first half of the LB #1 to #6 and SB #1, #2 for effectively executing equalization of frequency regions at the receiving side. Addition of CP is to copy the latter portion of the block to the first portion as shown in FIG. 20.

As a pilot signal used in an uplink wireless accessing in the mobile communication system of the next generation, the Zadoff-Chu sequence, which is one of CAZAC (Constant Amplitude Zero Autocorrelation) sequences, (refer to, for example, a Non-Patent document 2, K. Fazel and S. Keiser, "Multi-Carrier and Spread Spectrum Systems" (John Willey and Sons, 2003)) is currently drawing attention.

The Zadoff-Chu sequence is represented by the formula:

$$C\_k(n)=\exp[-(j2\ \Pi k/N)(n(n+1)/2+qn)] \quad (1).$$

In the formula (1), n=0, 1, ..., N−1, and q is an arbitrary integer and N is a sequence length.

The CAZAC sequence is a sequence that has constant amplitude in both regions of time and frequency and it has always Zero Auto-Correlation for time shift that is other than the cyclic self-correlation value is 0. As the CAZAC sequence has Constant amplitude in a time region, it can keep PAPR (Peak to Average Power Ratio) low. As the CAZAC sequence also has Constant amplitude in a frequency region, it is a sequence suitable for propagation path estimation in the frequency region. Here, a small PAPR means that it can keep the power consumption low. This feature is preferred in the mobile communication.

Further, as the "CAZAC sequence" has a complete self-correlating characteristic, it is advantageous in being appropriate for detecting a time of a received signal and draws attention as the pilot sequence appropriate for a single carrier transmission, which is an uplink wireless accessing method in the wireless communication system of the next generation.

In the cellular environment (wireless communication network with a service area divided into a plurality of cells), the base station receives not only an uplink signal of the mobile station in the cell managed by the base station as an uplink received signal but also an uplink signal of the mobile station of the other cell (particularly, adjacent cell) (see FIG. 1). The mobile station receives not only a downlink signal from the base station of the cell managed by the base station but also a downlink signal of the base station of the other cell as it receives the uplink signal. Here, communication from the mobile station to the base station is called an uplink and communication from the base station to the mobile station is called a downlink. The above-mentioned cell can also be called a sector.

As the base station captures a pilot signal from the mobile station in the cell managed by the base station in the uplink communication, the pilot signal sent from the mobile station of the other cell needs to be reduced sufficiently. Thus, it is desirable that a set of small sequences of correlation values is allocated as the pilot sequence of cells adjacent to each other. In the downlink communication, it is also desirable that a set of small sequences of correlation values is allocated as the pilot sequence of cells adjacent to each other for the same reason for the uplink communication.

The correlation characteristic of the CAZAC sequence largely depends on the sequence length. That is to say, if the sequence length includes a prime number or a big prime number, the correlate characteristic is very good (correlation value is small). In contrast, if the sequence length is a combined number comprising only small prime numbers (for example, an exponent such as 2 or 3), the correlate characteristic greatly degrades (a big value is included in the correlation value).

Specifically, if the sequence length of Zadoff-Chu sequence is a prime number, the correlation value of arbitrary sequences is always kept $1/\sqrt{N}$ (N is a sequence length and the root is a prime number) (for example, refer to the Non-Patent document 2). If the sequence length: N=127, the correlation value is always kept $1/\sqrt{127}$, and if the sequence length: N=128, the worst value (the maximal value) of the correlation value is $1/\sqrt{2}$.

Sequences whose correlation value is $1/\sqrt{N}$ are abundant by the number of (N−1). From the viewpoint of a correlation value, it is proposed that the CAZAC sequence whose sequence length is the same primary number and whose parameter [parameter in the formula (1)] is different is allocated to each cell as a pilot sequence. As a result of that allocation, the number of sequences are (N−1), thus, the same pilot sequence needs to be re-performed for each of the (N−1) cells. The (N−1) will be called as the number of repeating of the pilot sequences below.

On the other hand, if the pilot sequence is sent in a plurality of blocks (two SB #1, #2 in the frame format shown in FIG. 19) as in the frame format of an uplink wireless access considered in the wireless communication system of the next generation (see FIG. 19) and if a pilot sequence is allocated for each cell as mentioned above (that is to say, if sent pilot sequence is common in a plurality of pilot blocks in a frame and the pilot sequences used in SB #1, #2 of the frame format shown in FIG. 19 are the same), an interference pattern from the other cell are the same in each pilot block at the receiving side.

That causes a problem in that no effect of reduction of interference by other cells by combining (averaging) a plurality of pilot blocks can be obtained at the receiving side. This is because no effect of reduction of interference by other cells can be obtained; as the pilot sequences sent in a plurality of pilot blocks are the same, interference from the other cells are received in the same manner (interference pattern) in every pilot block to combine (average) them (see FIG. 21).

If a pilot sequence common in a plurality of pilot blocks in a frame is used in a conventional W-CDMA (Wideband-Code Division Multiple Access) and the like, a sequence which is a random sequence multiplied for a frame called a scrambling code is sent. Thus, a pattern of the pilot sequence to be sent differs for each pilot block so that the effect of reduction of interference by other cells can be obtained by combining (averaging) a plurality of pilot blocks at the receiving side.

In the abovementioned conventional uplink wireless accessing system, if a sequence such as the abovementioned CAZAC sequence is used as a pilot sequence, it is limited that a scrambling code cannot be applied to. This is because that a unique characteristic is lost [for example, CAZAC characteristic (a characteristic advantageous for receiving such as constant amplitude in a time and frequency regions, and the cyclical self-correlation value is always 0 except for the case where the time shift is 0)], as a result of multiplying a sequence such as the CAZAC sequence by a random sequence such as a scrambling code.

If a sequence such as the CAZAC sequence is used as a pilot sequence and only a code is allocated for each cell, the problem in that the effect of reduction of interference cannot be obtained by combining (averaging) received pilot blocks in the abovementioned frame cannot be avoided.

The object of the present invention is to provide a wireless communication system, a pilot sequence allocation apparatus and a method for allocating pilot sequence to be used in the apparatus and a mobile station using the method that eliminates the abovementioned problems and can obtain the effect of reduction of interference by combining received pilot blocks if a sequence such as the CAZAC sequence is used as a pilot sequence.

BRIEF SUMMARY OF THE INVENTION

The first wireless communication system of the present invention is a wireless communication system including a plurality of cells, a pilot sequence allocation apparatus for allocating a pilot sequence used in communication between a base station and a mobile station to each cell, and the mobile station, comprising:

central processing unit provided in the pilot sequence allocation apparatus, of allocating different pilot sequence to each of a plurality of pilot blocks in a frame for one of the plurality of cells, and central processing unit provided in the mobile station, of allocating the different pilot sequence to each of a plurality of pilot blocks in a frame for said base station.

The second wireless communication system of the present invention is that at least one of a plurality of pilot sequences allocated to one of the plurality of cells is different from at least one of a plurality of pilot sequences allocated to a different cell.

The third wireless communication system of the present invention is that the pilot sequence allocation apparatus divides the pilot sequence into sets of the number of pilot blocks in the frame and allocates the set to each of the plurality of cells.

The fourth wireless communication system of the present invention includes N (N is an integer of 2 or more) pilot blocks in the frame, and wherein the pilot sequence allocation apparatus performs allocation of the pilot sequence so that the pilot sequence is reused by the number of repeating cells M (M is an integer of 2 or more) and the pilot sequences to be allocated to $j^{th}$ pilot block (j=1, 2, . . . , N) of the cell i (i=1, 2, . . . , M) are different for different cells.

The fifth wireless communication system of the present invention is that the pilot sequence allocation apparatus performs allocation of the pilot sequence so that a pilot sequence to be allocated to $j^{th}$ pilot block of the cell i and a pilot sequence to be allocated to $j'^{th}$ pilot block of the cell i' (j'≠j) are different.

The sixth wireless communication system of the present invention is that the pilot sequence allocation apparatus makes a pilot sequence allocated to the $j^{th}$ pilot block of the cell i a candidate for the sequence to be allocated to $j'^{th}$ (j'≠j) pilot block of the other cell i' (i'≠i) again.

The seventh wireless communication system of the present invention is that the pilot sequence allocation apparatus allocates the sequence $C\_(\{i+j-2\}) \bmod M\}+1)$ to the $j^{th}$ pilot block of the cell i so that the total number of the pilot sequence C_(1), C_(2), . . . , C_(M) is equal to the number of repeating cells M and the number of pilot blocks in one frame N is at the number of repeating cells M or less (N≤M).

The eighth wireless communication system of the present invention is that the pilot sequence is the CAZAC (Constant Amplitude Zero Auto-Correlation) sequence.

The ninth wireless communication system of the present invention is that a sequence length of the pilot sequence is a primary number length.

The first pilot sequence allocation apparatus of the present invention is a pilot sequence allocation apparatus for allocating a pilot sequence used in communication between a base station and a mobile station for each of a plurality of cells of the wireless communication system, comprising:

central processing unit of allocating a pilot sequence different for each of a plurality of pilot blocks in a frame for one of the plurality of cells.

The second pilot sequence allocation apparatus of the present invention is that at least one of a plurality of pilot sequences allocated to one of the plurality of cells is different from at least one of a plurality of pilot sequences allocated to a different cell.

The third pilot sequence allocation apparatus of the present invention is that it divides the pilot sequence into sets of the number of pilot blocks in the frame and allocates the set to each of the plurality of cells.

The fourth pilot sequence allocation apparatus of the present invention allocates the pilot sequence so that the pilot sequence to be allocated to the $j^{th}$ pilot block (j=1, 2, . . . , N) of the cell i (i=1, 2, . . . , M) and a pilot sequence to be allocated to the $j^{th}$ pilot block of the other cell are different from each other in a frame configuration including N (N is an integer of 2 or more) pilot blocks is included in a frame, when the pilot sequence is reused by the number of repeating cells M (M is an integer of 2 or more).

The fifth pilot sequence allocation apparatus of the present invention performs allocation of the pilot sequence so that a pilot sequence to be allocated to $j^{th}$ pilot block of the cell i and a pilot sequence to be allocated to $j'^{th}$ pilot block of the cell i (j'≠j) are different.

The sixth pilot sequence allocation apparatus of the present invention makes a pilot sequence allocated to the $j^{th}$ pilot block of the cell i a candidate for the sequence to be allocated to $j'^{th}$ (j'≠j) pilot block of the other cell i' (i'≠i) again.

The seventh pilot sequence allocation apparatus of the present invention allocates the sequence C_({i+j−2}) mod M}+1) to the $j^{th}$ pilot block of the cell i so that the total number of the pilot sequence C_(1), C_(2), . . . , C_(M) is equal to the number of repeating cells M and the number of pilot blocks in one frame N is at the number of repeating cells M or less (N≤M).

The eighth pilot sequence allocation apparatus of the present invention is that the pilot sequence is the CAZAC (Constant Amplitude Zero Auto-Correlation) sequence.

The ninth pilot sequence allocation apparatus of the present invention is that a sequence length of the pilot sequence is a primary number length.

The first method for allocating a pilot sequence of the present invention is a method for allocating a pilot sequence used in a wireless communication system including a plurality of cells, a pilot sequence allocation apparatus for allocating a pilot sequence used in communication between a base station and a mobile station to each cell, and the mobile station, comprising in the pilot sequence allocation apparatus:

allocating different pilot sequence to each of a plurality of pilot blocks in a frame for one of said plurality of cells.

The second method for allocating a pilot sequence of the present invention is that at least one of a plurality of pilot sequences allocated to one of the plurality of cells is different from at least one of a plurality of pilot sequences allocated to a different cell.

The third method for allocating a pilot sequence of the present invention is that the pilot sequence allocation apparatus divides the pilot sequence into sets of the number of pilot blocks in the one frame and allocates the set to each of the plurality of cells.

The fourth method for allocating a pilot sequence of the present invention includes N (N is an integer of 2 or more) pilot blocks in the frame, and wherein the pilot sequence allocation apparatus performs allocation of the pilot sequence so that the pilot sequence allocation apparatus reuses the pilot sequence by the number of repeating cells M (M is an integer of 2 or more) and the pilot sequences to be allocated to $j^{th}$ pilot block (j=1, 2, . . . , N) of the cell i (i=1, 2, . . . , M) are different for different cells.

The fifth method for allocating a pilot sequence of the present invention is that the pilot sequence allocation apparatus performs allocation of the pilot sequence so that a pilot sequence to be allocated to $j^{th}$ pilot block of the cell i and a pilot sequence to be allocated to $j'^{th}$ pilot block the cell i (j'≠j) are different.

The sixth method for allocating a pilot sequence of the present invention is that the pilot sequence allocation apparatus makes a pilot sequence allocated to the $j^{th}$ pilot block of the cell i a candidate for the sequence to be allocated to $j'^{th}$ (j'≠j) pilot block of the other cell i' (i'≠i) again.

The seventh method for allocating a pilot sequence of the present invention is that the pilot sequence allocation apparatus allocates the sequence C_({i+j−2}) mod M}+1) to the $j^{th}$ pilot block of the cell i so that the total number of the pilot sequence C_(1), C_(2), . . . C_(M) is equal to the number of repeating cells M and the number of pilot blocks in the one frame N is at the number of repeating cells M or less (N≤M).

The eighth method for allocating a pilot sequence of the present invention is that the pilot sequence is the CAZAC (Constant Amplitude Zero Autocorrelation) sequence.

The ninth method for allocating a pilot sequence of the present invention is that a sequence length of the pilot sequence is a primary number length.

The first mobile station of the present invention is a mobile station for communicating with a base station of a wireless communication system, comprising:

central processing unit of sending a signal that allocates a different pilot sequence to each of a plurality of pilot blocks in a frame for the base station.

The second mobile station of the present invention is that the central processing unit decides a pilot sequence to be allocated to the plurality of pilot blocks based on an index of the pilot sequence received from the base station.

The third mobile station of the present invention is at least one of pilot sequences allocated to one of the plurality of pilot blocks is different from at least one of a plurality of pilot sequences allocated to the mobile station of a different cell.

The recording medium of the present invention is a recording medium that records a program of a method for allocating a pilot sequence used in a wireless communication system including a plurality of cells, a pilot sequence allocation apparatus for allocating a pilot sequence used in communication between a base station and a mobile station to each cell, and the mobile station, wherein the recording medium is provided in the pilot sequence allocation apparatus and records a program for causing a computer to execute allocating different pilot sequence to each of a plurality of pilot blocks in a frame for the plurality of cells.

According to the present invention, significant effect of reduction of interference can be obtained by combining received pilot blocks when the abovementioned configurations and operations are used and a sequence such as the CAZAC sequence is used as a pilot sequence.

BRIEF DESCRIPTION OF THE DRAWINGS

FIG. 5 is a diagram showing a configuration of an allocation correspondence table showing a pilot sequence allocation by the first embodiment of the present invention;

FIG. 10 is a diagram showing a configuration of an allocation correspondence table showing allocation of pilot sequence by the third embodiment of the present invention;

FIG. 15A to 15C are diagrams showing allocation examples of pilot sequence to the pilot blocks (SB #1, SB #2) used in simulation in the present invention;

FIG. 16A to 16C are diagrams showing allocation examples of pilot sequence to the pilot blocks (SB #1, SB #2) used in simulation in the present invention;

FIG. 17 is a diagram showing exemplary parameters used in a simulation relating to the present invention;

FIG. 18 is a diagram showing a case where a data signal and a pilot signal are multiplexed in a frequency region of a simulation in the present invention;

FIG. 19 is a diagram showing an example of a configuration of a frame format used in the single carrier transmission method;

FIG. 20 is a diagram for illustrating addition of a cyclic prefix; and

FIG. 21 is a diagram for illustrating problems caused by conventional allocation of pilot sequence.

DETAILED DESCRIPTION OF THE PREFERRED EMBODIMENTS

Now, embodiments of the present invention will be described with reference to drawings.

Embodiment 1

Figure 1:
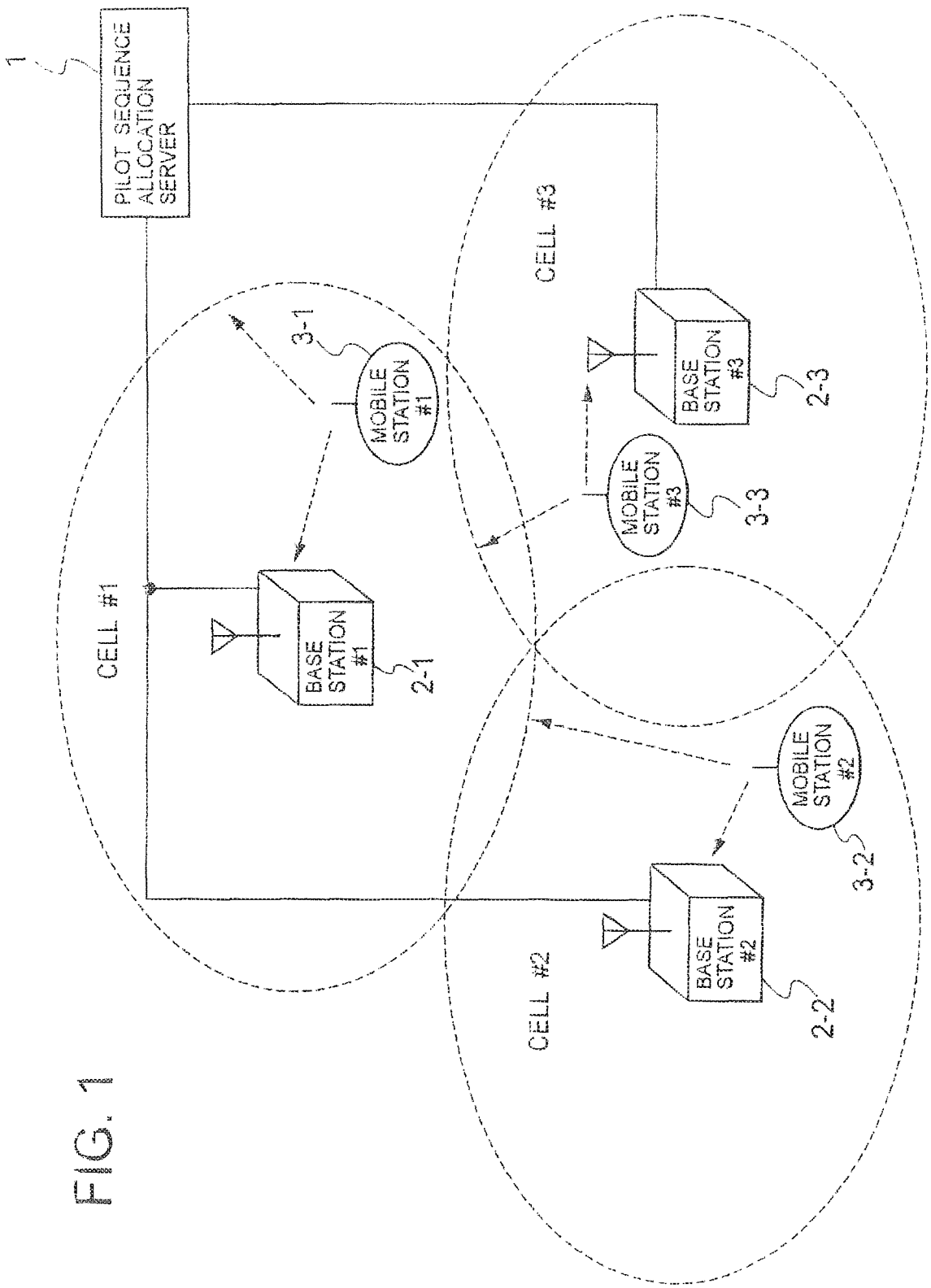
FIG. 1 is a block diagram showing a configuration of wireless communication system by the first embodiment of the present invention.

FIG. 1 is a block diagram showing a configuration of wireless communication system by the first embodiment of the present invention. In FIG. 1, the wireless communication system by the first embodiment of the present invention includes a pilot sequence allocation server 1, base stations (#1 to #3) 2-1 to 2-3, and mobile stations (#1 to #3) 3-1 to 3-3.

At cells #1 to #3 managed by each of the base stations (#1 to #3) 2-1 to 2-3, a signal of the pilot sequence allocated in a method to be described below is sent as communication between the base stations (#1 to #3) 2-1 to 2-3 and the mobile stations (#1 to #3) 3-1 to 3-3. Here, the communication from the mobile stations (#1 to #3) 3-1 to 3-3 to the base stations (#1 to #3) 2-1 to 2-3 is called uplink communication and communication from the base stations to the mobile stations (#1 to #3) 3-1 to 3-3 is called downlink communication.

A general wireless communication network with a service area divided into a plurality of cells #1 to #3 is supposed as a wireless communication system by the first embodiment of the present invention. The plurality of base stations (#1 to #3) 2-1 to 2-3 are combined together and connected to the pilot sequence allocation server 1. The pilot sequence allocation server 1 needs not to be present independent of the base stations (#1 to #3) 2-1 to 2-3 and may be provided in any of the plurality of base stations (#1 to #3) 2-1 to 2-3. Further, the pilot sequence allocation server 1 may be provided in the higher-level device of the plurality of base stations (#1 to #3) 2-1 to 2-3 (for example, a base station controlling device or a core network) (not shown).

Figure 2:
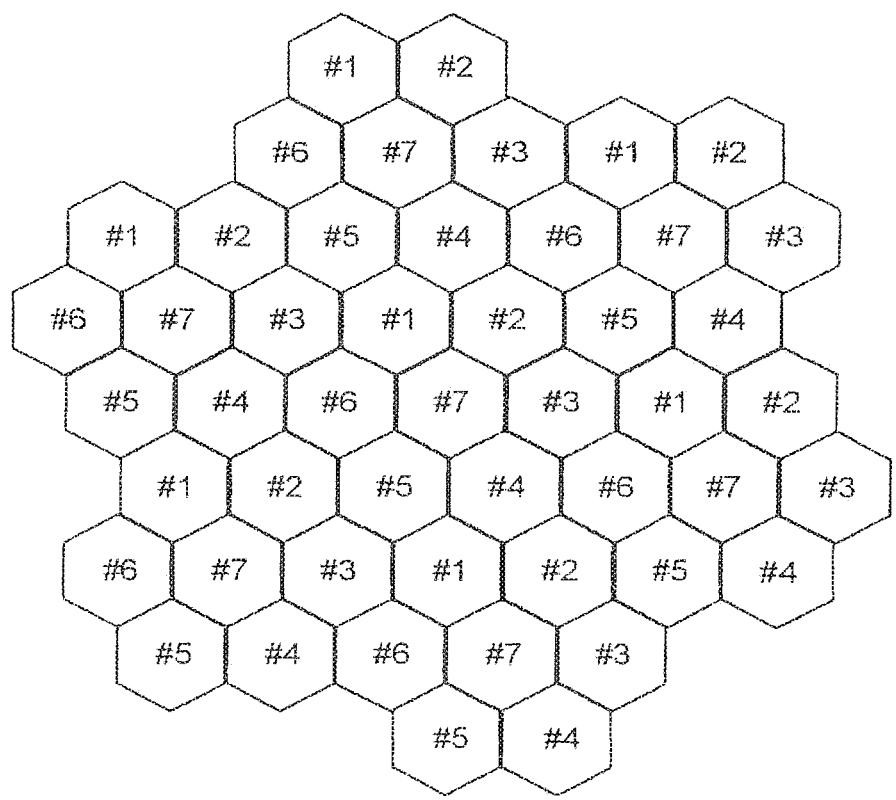
FIG. 2 is a diagram showing a cell arrangement pattern used in the first embodiment of the present invention.

FIG. 2 is a diagram showing a cell arrangement pattern used in the first embodiment of the present invention. FIG. 2 shows a seven cell repeating pattern by seven base stations from #1 to #7. The pilot sequence allocation server 1 allocates any of the seven indices from #1 to #7 shown in FIG. 2 to each of the connected base stations. Based on the indices, the pilot sequence allocation server 1 performs pilot sequence allocation to be described later for each of the seven base stations thereunder.

A frame format to be used for sending communication data and a pilot signal between the base stations (#1 to #3) 2-1 to 2-3 and the mobile stations (#1 to #3) 3-1 to 3-3 has a configuration as shown in FIG. 19. It is considered that a data signal is sent in six LBs (Long Block) #1 to #6 by one sub-frame, and a pilot signal is sent in two SB (Short Block) #1, #2.

That is to say, in the embodiment, it is assumed that the number of pilot blocks in one frame is two, the cell repetition factor in a pilot sequence is seven, and the pilot sequence used for sending is the Zadoff-Chu sequence represented by the formula (1), and the number of sequences used is seven, the same number as the cell repetition factor. The sequence is assumed as $\{C\_1, C\_2, C\_3, C\_4, C\_5, C\_6, C\_7\}$.

Further, the pilot sequence allocation server 1 is assumed to previously store the cell repeating pattern of the base station (#1 to #3) 2-1 to 2-3 each of which is connected to the server 1 (This means a cell arrangement pattern in which the same pilot patterns are not adjacent to each other. In the embodiment, it is assumed the seven cell repeating pattern as shown in FIG. 2).

Figure 3:
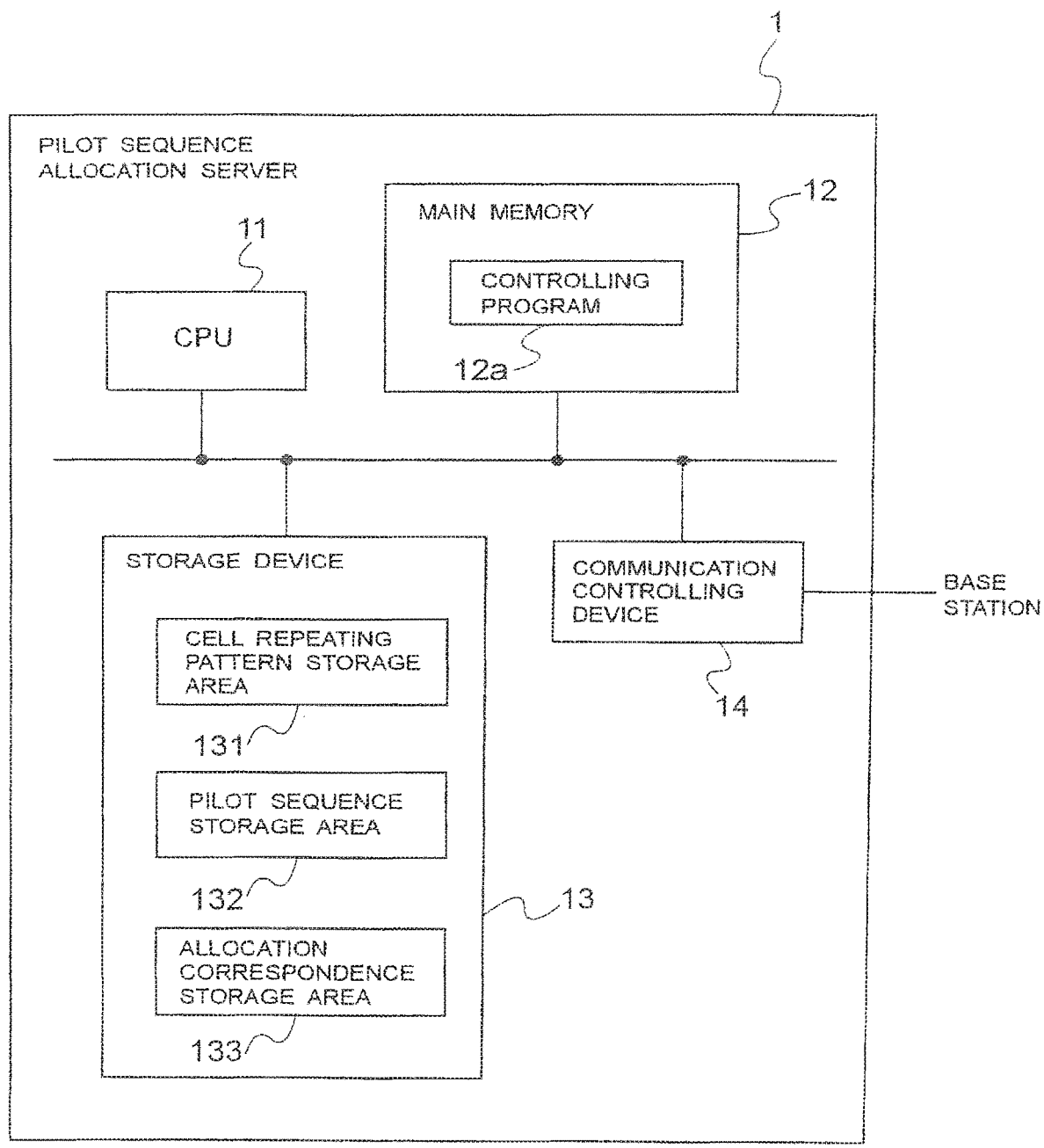
FIG. 3 is a block diagram showing an example of a configuration of the pilot sequence allocation server of FIG. 1.

FIG. 3 is a block diagram showing an example of a configuration of the pilot sequence allocation server 1 of FIG. 1. In FIG. 3, the pilot sequence allocation server 1 includes a CPU (central processing unit) 11, a main memory 12 for storing a controlling program 12a executed by the CPU 11, a storage device 13 for storing data and the like used when the CPU 11 executes the controlling program 12a and a communication controlling device 14 for controlling communication with each of the base stations (#1 to #3) 2-1 to 2-3.

The storage device 13 includes a cell repeating pattern storage area 131 for storing the above-mentioned cell repeating pattern, a pilot sequence storage area 132 for storing a pilot sequence, and an allocation correspondence storage area 133 storing an allocation correspondence table showing correspondence between each of the base stations (cell #1 to #K) and the pilot sequence to be allocated to the base station.

Figure 4:
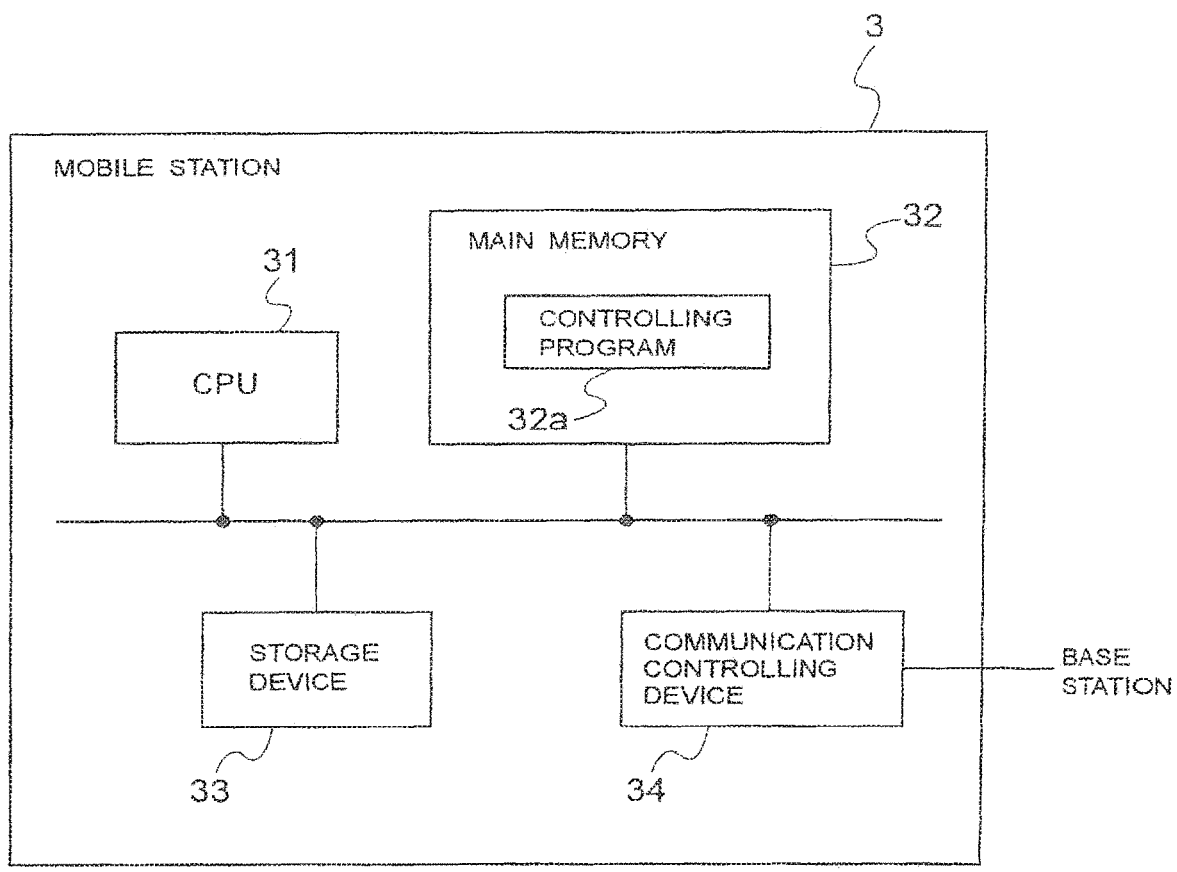
FIG. 4 is a diagram showing an example of a configuration of the mobile stations of FIG. 1.

FIG. 4 is a block diagram showing an example of a configuration of the mobile stations (#1 to #3) 3-1 to 3-3 of FIG. 1. In FIG. 4, the mobile stations 3 includes a CPU 31, a main memory 32 for storing a controlling program 32a executed by the CPU 31, a storage device 33 for storing data and the like used when the CPU 31 executes the controlling program 32a, and a communication controlling device 34 for controlling communication with each of the base stations (#1 to #3) 2-1 to 2-3. The mobile stations (#1 to #3) 3-1 to 3-3 have the same configuration as that of the mobile station.

Figure 6:
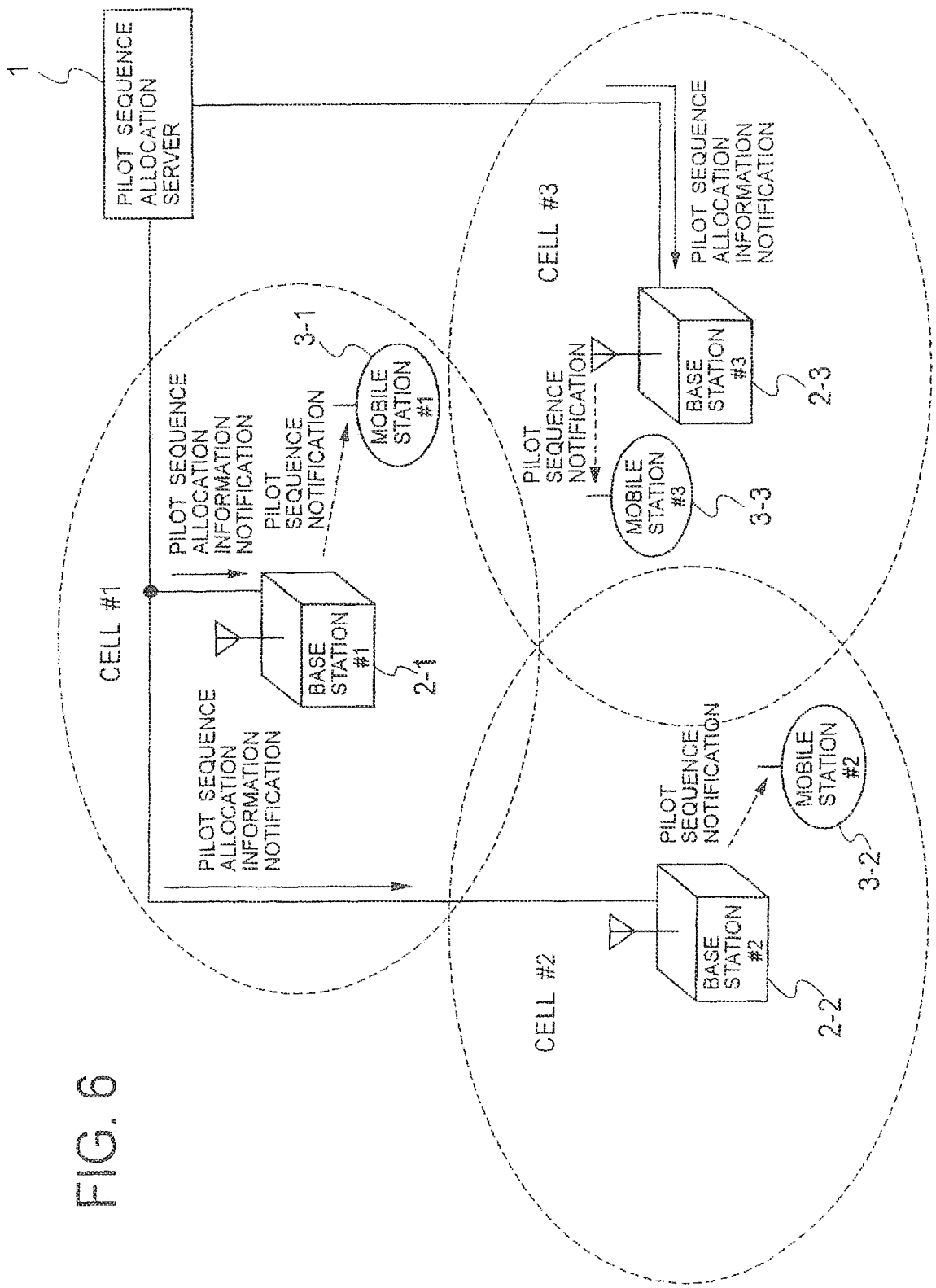
FIG. 6 is a diagram showing notification of a pilot sequence in the wireless communication system by the first embodiment of the present invention.
Figure 7:
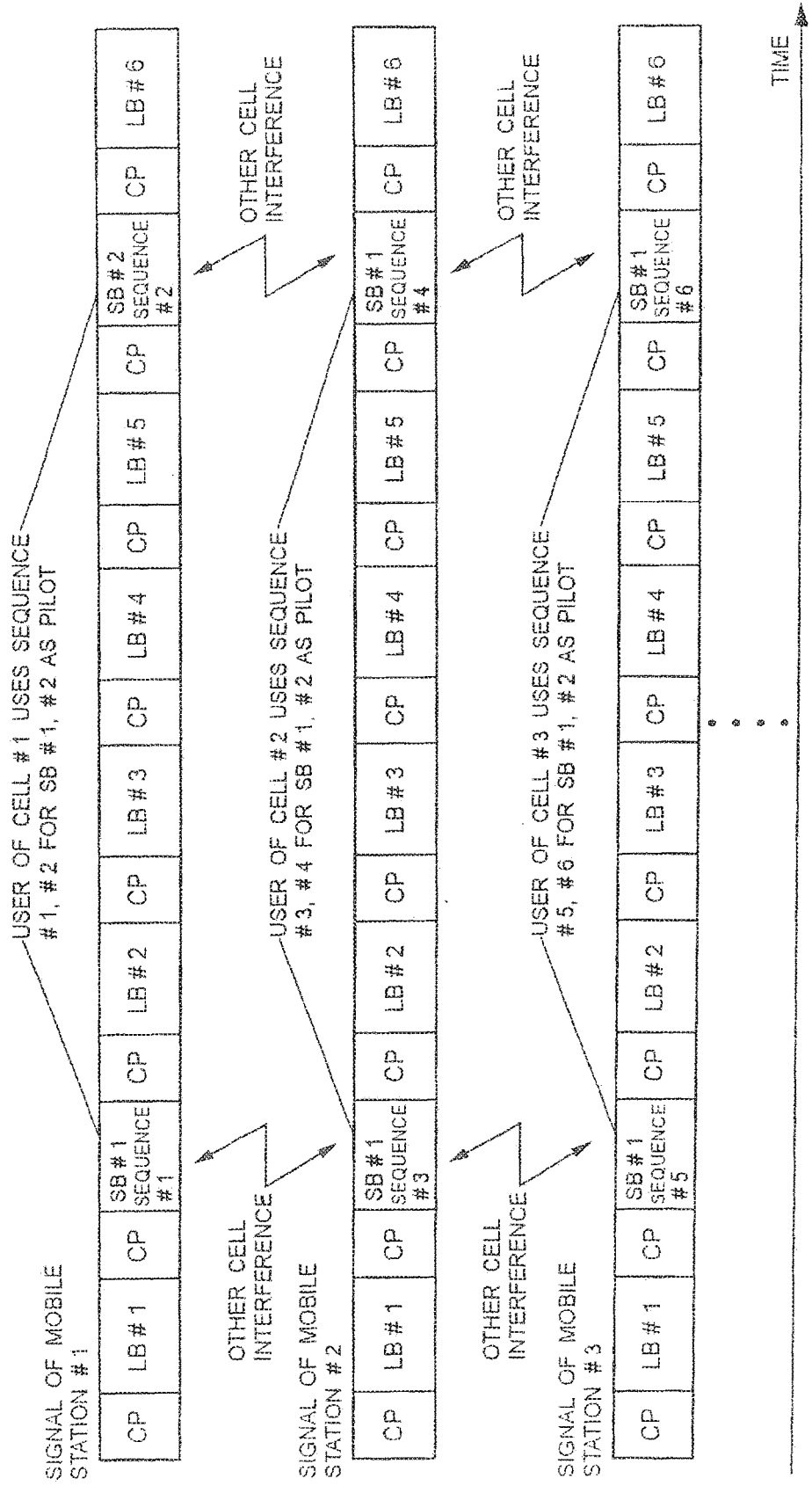
FIG. 7 is a diagram for illustrating effect of the pilot sequence allocation in the wireless communication system by the first embodiment of the present invention.

FIG. 5 is a diagram showing an allocation correspondence table showing a pilot sequence allocation by the first embodiment of the present invention. FIG. 6 is a diagram showing notification of a pilot sequence in the wireless communication system by the first embodiment of the present invention. FIG. 7 is a diagram for illustrating effect of the pilot sequence allocation in the wireless communication system by the first embodiment of the present invention. Referencing to FIGS. 1 to 7, operations of the pilot sequence allocation in the wireless communication system by the first embodiment of the present invention will be described.

The wireless communication system by the first embodiment of the present invention adopts a pilot sequence allocation method of dividing the pilot sequences by the number of 2K into K sets like $\{[C\_1, C\_2], [C\_3, C\_4], \ldots, [C\_(2K-1), C\_2K]\}$ and allocating a set of the pilot sequences to each of the cells #1 to #K (see FIG. 5).

That is to say, in FIG. 5, two pilot sequences: $\{C\_1, C\_2\}$ are allocated to two pilot blocks (SB #1, #2) of the cell #1, two pilot sequences: $\{C\_3, C\_4\}$ are allocated to two pilot blocks (SB #1, #2) of the cell #2, two pilot sequences: $\{C\_5, C\_6]$ are allocated to two pilot blocks (SB #1, #2) of the cell #3, and two pilot sequences $\{C\_7, C\_8\}$ are allocated to two pilot blocks (SB #1, #2) of the cell #4.

Similarly, in FIG. 5, two pilot sequences $\{C\_(2K-3), C\_(2K-2)\}$ are allocated to two pilot blocks (SB #1, #2) of the cell #(K-1), and two pilot sequences $\{C\_(2K-1), C\_2K\}$ are allocated to two pilot blocks (SB #1, #2) of the cell #K.

As shown in FIG. 5, the pilot sequence allocation server 1 sends pilot sequence allocation information notification to each of the base stations (#1 to #3) 2-1 to 2-3 and allocates a pilot sequence to each of the base stations (#1 to #3) 2-1 to 2-3 based on the set allocation correspondence table. Each of the base stations (#1 to #3) 2-1 to 2-3 notifies the mobile stations (#1 to #3) 3-1 to 3-3 by sending downlink notification channel including an index of the allocated pilot sequence or the like to a service area in the cells #1 to #3 [pilot sequence notification to mobile station (#1 to #3) 3-1 to 3-3] (see FIG. 6).

Each of the mobile stations (#1 to #3) 3-1 to 3-3 in the service area obtains an index of two pilot blocks (SB #1, #2) used in the cells (#1 to #3) in which the self-station is present by receiving a downlink notification channel or the like. Each of the mobile stations (#1 to #3) 3-1 to 3-3 sends different pilot sequences for SB #1 and #2 based on the index of the two pilot blocks obtained from the downlink notification channel or the like, when the mobile station sends data to each of the base stations (#1 to #3) 2-1 to 2-3.

At this moment, an interference pattern that SB #1 receives from the mobile station of another cell and an interference pattern that SB #2 receives from the mobile station of another cell are different. That is effective in reducing interference of another cell by combining (averaging) SB #1 and #2 in allocating a pilot sequence in the embodiment (see FIG. 7).

As such, in the embodiment, different pilot sequences can be sent in different pilot blocks in a frame (SB #1, #2) so that significant effect such as a plurality of receiving pilot blocks are combined (averaged) together at the receiving side to reduce an interference of another cell can be obtained.

As mentioned above, as this embodiment is changed to allocate two sequences instead of a sequence to a cell in, the reused cell repetition factor of the pilot sequence is reduced. Each of the embodiments to be described later devised on that point and also improves in that the amount of interference from a cell using the same code increases as a distance between the base stations using the same pilot sequences decreases. Although a method for allocating an uplink pilot sequence to each cell has been described in the embodiment, the similar pilot sequence allocation method can be applied to the method for allocating the downlink pilot sequence to each cell.

Embodiment 2

Figure 8:
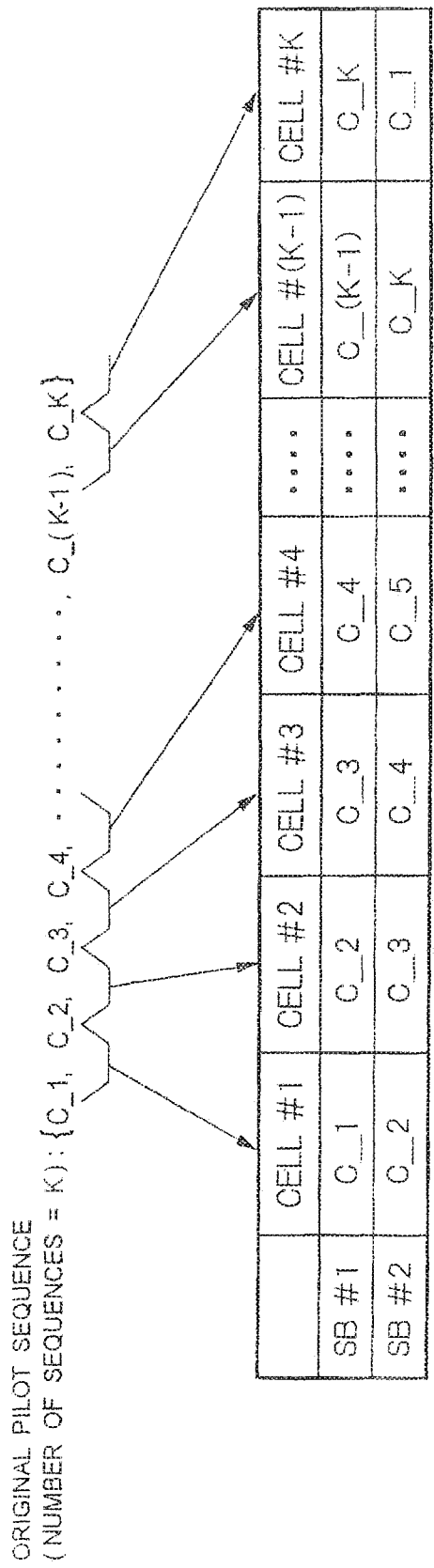
FIG. 8 is a diagram showing a configuration of an allocation correspondence table showing an allocation of pilot sequence by the second embodiment of the present invention.
Figure 9:
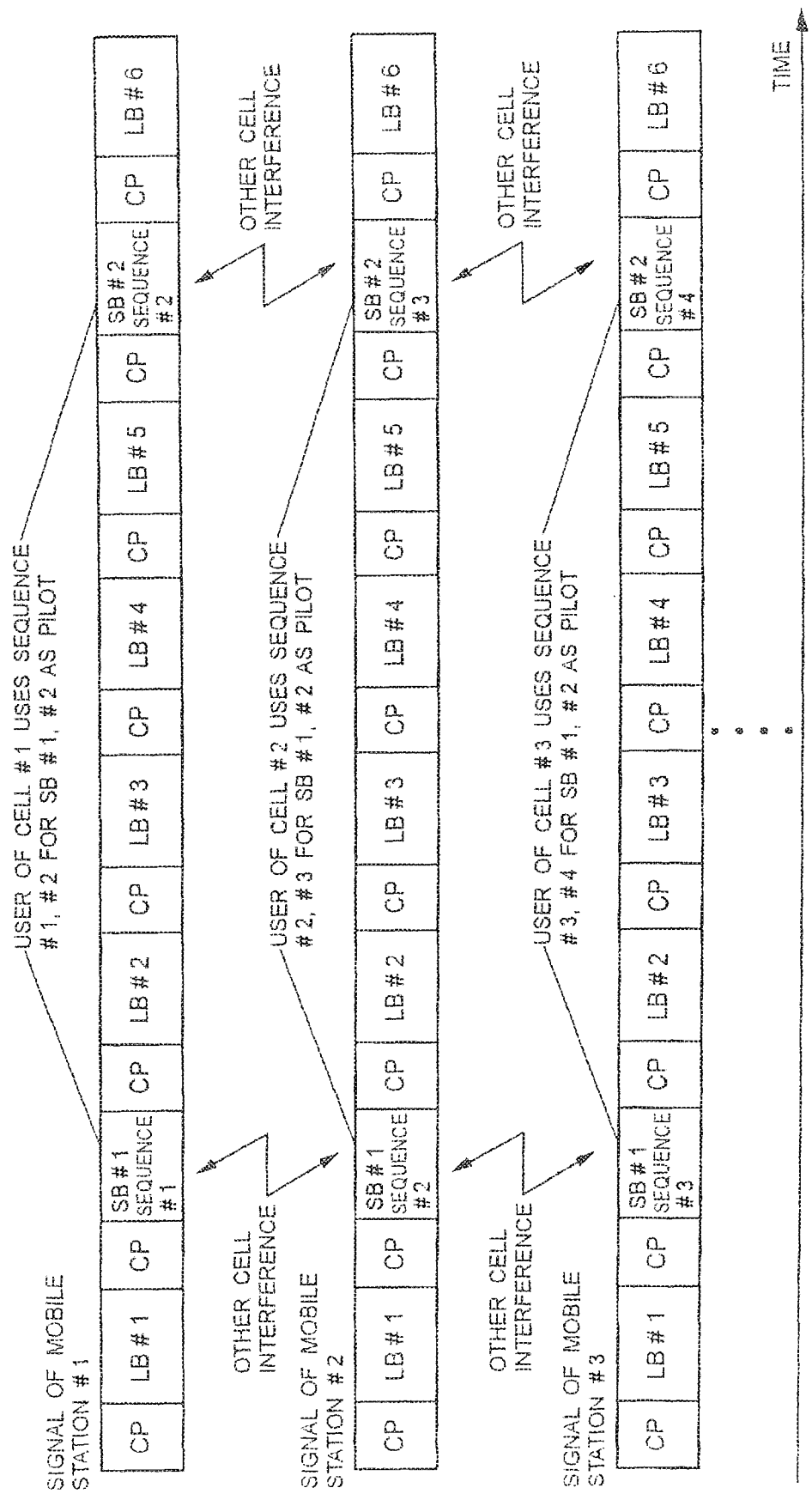
FIG. 9 is a diagram for illustrating effect of allocation of a pilot sequence in the wireless communication system by the second embodiment of the present invention.

FIG. 8 is a diagram showing an allocation correspondence table showing an allocation of pilot sequence by the second embodiment of the present invention. FIG. 9 is a diagram for illustrating effect of allocation of a pilot sequence in the wireless communication system by the second embodiment of the present invention.

The wireless communication system by the second embodiment of the present invention has the same configuration as that of the wireless communication system by the first embodiment of the present invention shown in FIG. 1 except for a method for allocating a pilot sequence. The pilot sequence allocation server by the second embodiment of the present invention also has the same configuration as that of the pilot sequence allocation server 1 by the first embodiment of the present invention shown in FIG. 3. Further, the mobile station by the second embodiment of the present invention also has the same configuration as that of the mobile station 3 by the first embodiment of the present invention shown in FIG. 4. The cell arrangement pattern used in the second embodiment of the present invention also has the same cell arrangement pattern used in the first embodiment of the present invention shown in FIG. 2.

The pilot sequence allocation server 1 allocates one of the seven indices from #1 to #7 shown in FIG. 2 to each of the connected base stations (#1 to #3) 2-1 to 2-3. Based on the indices, the pilot sequence allocation server 1 allocates a pilot sequence for each of the seven base stations thereunder.

FIG. 8 shows an allocation correspondence table for allocating two pilot sequences: $\{C\_K, C\_(K+1)\}$ (K=1, 2, ..., 6) to each of the cells of the indices #K (K=1, 2, ..., 7). In the case of K=7, $\{C\_7, C\_1\}$ is allocated. The pilot sequence allocation server 1 sends pilot sequence allocation information notification to each of the base stations (#1 to #3) 2-1 to 2-3 and allocates a pilot sequence to each of the base stations (#1 to #3) 2-1 to 2-3 based on the allocation correspondence table set as shown in FIG. 8.

Each of the base stations (#1 to #3) 2-1 to 2-3 notices the mobile stations (#1 to #3) 3-1 to 3-3 by sending a downlink notification channel or the like including an index of the allocated pilot sequences to the service area of the self-station [pilot sequence notification to mobile stations (#1 to #3) 3-1 to 3-3]. The mobile stations (#1 to #3) 3-1 to 3-3 in the service area obtain an index of two pilot blocks (SB #1, #2) used in a cell in which the self-station is present by receiving the downlink notification channel or the like. Then, the mobile stations (#1 to #3) 3-1 to 3-3 sends pilot sequences that are different for SB #1 and #2 as shown in FIG. 9 based on the index of two pilot blocks obtained from the downlink notification channels and the like when it sends data to the base stations (#1 to #3) 2-1 to 2-3.

That is to say, in FIG. 8, two pilot sequences: {C_1, C_2} are allocated to two pilot blocks (SB #1, #2) of the cell #1, two pilot sequences: {C_2, C_3} are allocated to two pilot blocks (SB #1, #2) of the cell #2, two pilot sequences:{C_3, C_4} are allocated to two pilot blocks (SB #1, #2) of the cell #3, and two pilot sequences {C_4, C_5} are allocated to two pilot blocks (SB #1, #2) of the cell #4.

Similarly, in FIG. 8, two pilot sequences {C_(K−1), C_K} are allocated to two pilot blocks (SB #1, #2) of the cell #(K−1), and two pilot sequences {C_K, C_1} are allocated to two pilot blocks (SB #1, #2) of the cell #K.

As such, in the embodiment, different pilot sequences can be sent in different pilot blocks (SB #1, #2) in a frame without decreasing the cell repetition factor for reusing a pilot sequence by allocating the pilot sequence allocated to SB #2 of a certain base station (cell) to SB #1 of the other base station (cell) again. From that, significant effect in reducing interference of another cell can be realized without decreasing the cell repetition factor for reusing pilot sequences by combining (averaging) a plurality of pilot blocks at the receiving side in the embodiment.

Embodiment 3

FIG. 10 is a diagram showing an allocation correspondence table showing allocation of pilot sequence by the third embodiment of the present invention. The wireless communication system by the third embodiment of the present invention has the same configuration as that of the wireless communication system by the first embodiment of the present invention shown in FIG. 1 except for a method for allocating a pilot sequence. The pilot sequence allocation server by the third embodiment of the present invention also has the same configuration as that of the pilot sequence allocation server 1 by the first embodiment of the present invention shown in FIG. 3. Further, the mobile station by the third embodiment of the present invention also has the same configuration as that of the mobile station 3 by the first embodiment of the present invention shown in FIG. 4. The cell arrangement pattern used in the third embodiment of the present invention also has the same cell arrangement pattern used in the first embodiment of the present invention as shown in FIG. 2.

The pilot sequence allocation server 1 allocates one of the seven indices from #1 to #7 shown in FIG. 2 to each of the connected base stations (#1 to #3) 2-1 to 2-3. Based on the indices, the pilot sequence allocation server 1 allocates a pilot sequence for each of the seven base stations thereunder.

FIG. 10 shows an allocation correspondence table for dividing cells by the number of K for performing pilot allocation into some regions (groups) and allocating a set of pilot sequences for each of the divided regions. The pilot sequence allocation server 1 sends pilot sequence allocation information notification to each of the base stations (#1 to #3) 2-1 to 2-3 and allocates a pilot sequence to each of the base stations (#1 to #3) 2-1 to 2-3 based on the allocation correspondence table set as shown in FIG. 10.

Each of the base stations (#1 to #3) 2-1 to 2-3 notices the mobile stations (#1 to #3) 3-1 to 3-3 by sending a downlink notification channel or the like including an index of the allocated pilot sequences to the service area of the self-station [pilot sequence notification to mobile stations (#1 to #3) 3-1 to 3-3]. The mobile stations (#1 to #3) 3-1 to 3-3 in the service area obtain an index of two pilot blocks (SB #1, #2) used in a cell in which the self-station is present by receiving the downlink notification channel or the like. Then, the mobile stations (#1 to #3) 3-1 to 3-3 sends pilot sequences that are different for SB #1 and #2 based on the index of two pilot blocks obtained from the downlink notification channels and the like when it sends data to the base stations (#1 to #3) 2-1 to 2-3.

That is to say, in FIG. 10, the cell #1 and the cell #2 belong to the first divided region, and two pilot sequences: {C_1, C_2} are allocated to two cells #1 and #2. Two pilot sequences: {C_1, C_2} are allocated to two pilot blocks (SB #1, #2) of the cell #1 in the order of C_1, C_2. On the other hand, two pilot sequences: {C_1, C_2} are allocated to two pilot blocks (SB #1, #2) of the cell #2 in the order of C_2, C_1.

The cell #3 and the cell #4 belong to the second divided region, and two pilot sequences: {C_3, C_4} are allocated to two cells #3 and #4. Two pilot sequences: {C_3, C_4} are allocated to two pilot blocks (SB #1, #2) of the cell #3 in the order of C_3, C_4. On the other hand, two pilot sequences: {C_3, C_4} are allocated to two pilot blocks (SB #1, #2) of the cell #4 in the order of C_4, C_3.

Similarly, the cell # (K−1) and the cell #K belong to the K/2 divided region, with two pilot sequence (C_(K−1), C_K) being allocated to two cells # (K−1) and the cell #K. Two pilot sequence: {C_(K−1), C_K} are allocated to two pilot blocks (SB #1, #2) of the cell # (K−1) in the order of C_(K−1) and C_K. On the other hand, two pilot sequences (C_(K−1), C_K1 are allocated to two pilot blocks (SB #1, #2) of the cell #K in the order of C_K, C_(K−1).

As such, in the embodiment, different pilot sequences can be sent in different pilot blocks in a frame (SB #1, #2) without decreasing the cell repetition factor for reusing a pilot sequences by allocating the pilot sequence allocated to SB #1 and SB #2 of a certain base station to each of SB #2 and SB #1 of the other base station again. With that, in the embodiment, significant effect in reducing interference of another cell can be achieved without reducing the cell repetition factor for reusing a pilot sequence by combining (averaging) a plurality of received pilot blocks at the receiving side.

Embodiment 4

Figure 11:
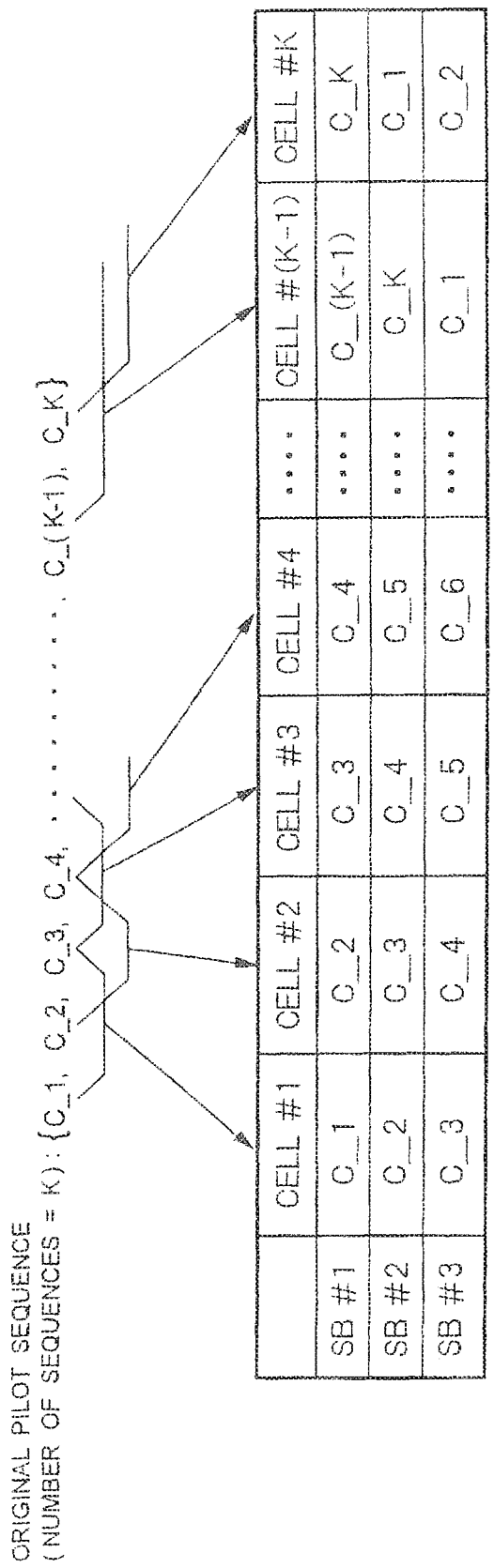
FIG. 11 is a diagram showing a configuration of an allocation correspondence table showing allocation of pilot sequence by the fourth embodiment of the present invention.

FIG. 11 is a diagram showing an allocation correspondence table showing allocation of pilot sequence by the fourth embodiment of the present invention. The wireless communication system by the fourth embodiment of the present invention has the same configuration as that of the wireless communication system in the first embodiment of the present invention shown in FIG. 1 except for the number of pilot blocks in a frame. The pilot sequence allocation server by the fourth embodiment of the present invention has the same configuration as that of the pilot sequence allocation server 1 by the first embodiment of the present invention shown in FIG. 3. Further, the mobile station by the fourth embodiment of the present invention has the same configuration as that of the mobile station 3 by the first embodiment of the present invention shown in FIG. 4. The cell arrangement pattern used in the fourth embodiment of the present invention has the same cell arrangement pattern used in the first embodiment of the present invention shown in FIG. 2. Further, a method for allocating a pilot sequence by the fourth embodiment of the present invention is the same method for allocating a pilot sequence by the second embodiment of the present invention shown in FIG. 8.

That is to say, in FIG. 11, three pilot sequences: {C_1, C_2, C_3} are allocated to three pilot blocks (SB #1, #2, #3) of the cell #1, and three pilot sequences: {C_2, C_3, C_4} are allocated to three pilot blocks (SB #1, #2, #3) of the cell #2.

In FIG. 11, three pilot sequences: {C_3, C_4, C_5} are allocated to three pilot blocks (SB #1, #2, #3) of the cell #3, and three pilot sequences {C_4, C_5, C_6} are allocated to three pilot blocks (SB #1, #2, #3) of the cell #4.

Similarly, in FIG. 11, three pilot sequences {C_(K−1), C_K, C_1} are allocated to three pilot blocks (SB #1, #2, #3) of the cell #(K−1), and three pilot sequences {C_K, C_1, C_2} are allocated to three pilot blocks (SB #1, #2, #3) of the cell #K.

As such, in the embodiment, different pilot sequences can be sent in different pilot blocks (SB #1, #2, #3) in a frame without decreasing the cell repetition factor for reusing a pilot sequence by allocating the pilot sequence allocated to SB #2 and SB #3 of a certain base station to SB #1 and SB #2 of the other base station again. From that, in the embodiment significant effect in reducing interference of another cell can be realized without decreasing the cell repetition factor for reusing pilot sequences by combining (averaging) a plurality of received pilot blocks at the receiving side in the embodiment.

Embodiment 5

Figure 12:
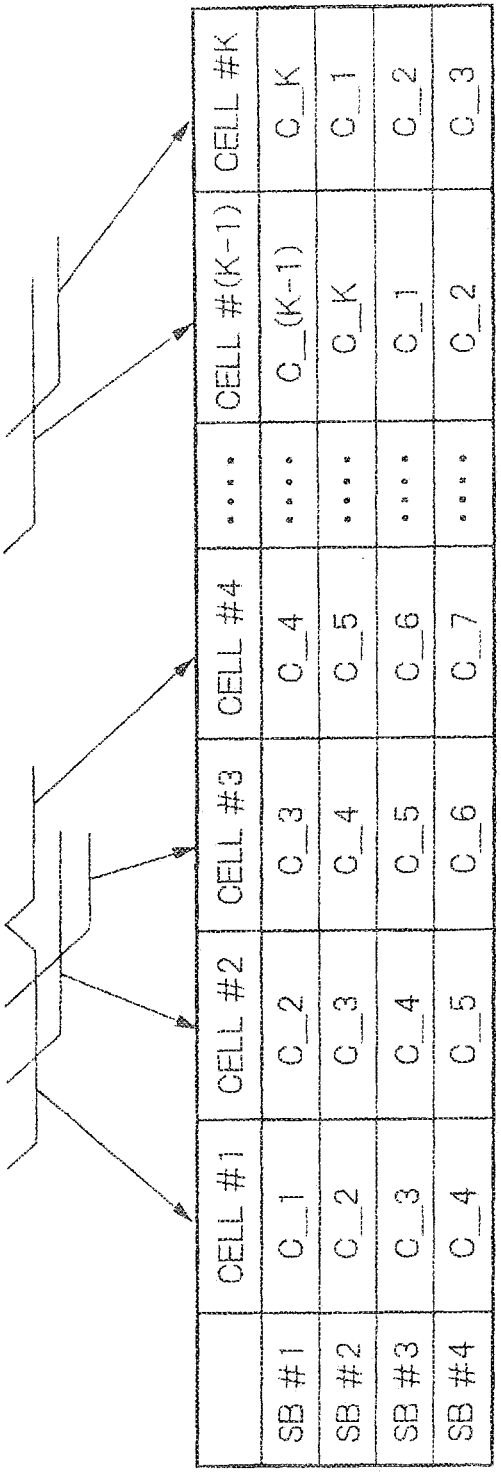
FIG. 12 is a diagram showing a configuration of an allocation correspondence table showing allocation of pilot sequences by the fifth embodiment of the present invention.

FIG. 12 is a diagram showing an allocation correspondence table showing allocation of pilot sequences by the fifth embodiment of the present invention. The wireless communication system by the fifth embodiment of the present invention has the same configuration as that of the wireless communication system by the first embodiment of the present invention shown in FIG. 1 except for the number of pilot blocks in a frame. The pilot sequence allocation server by the fifth embodiment of the present invention also has the same configuration as that of the pilot sequence allocation server 1 by the first embodiment of the present invention shown in FIG. 3. Further, the mobile station by the fifth embodiment of the present invention also has the same configuration as that of the mobile station 3 by the first embodiment of the present invention shown in FIG. 4. The cell arrangement pattern used in the fifth embodiment of the present invention also has the same cell arrangement pattern used in the first embodiment of the present invention as shown in FIG. 2. Further, a method for allocating a pilot sequence by the fifth embodiment of the present invention is the same method for allocating a pilot sequence by the second embodiment of the present invention as shown in FIG. 8.

That is to say, in FIG. 12, four pilot sequences: {C_1, C_2, C_3, C_4} are allocated to four pilot blocks (SB #1, #2, #3, #4) of the cell #1, and four pilot sequences: {C_2, C_3, C_4, C_5} are allocated to four pilot blocks (SB #1, #2, #3, #4) of the cell #2.

In FIG. 12, four pilot sequences: {C_3, C_4, C_5, C_6} are allocated to four pilot blocks (SB #1, #2, #3, #4) of the cell #3, and four pilot sequences: {C_4, C_5, C_6, C7} are allocated to four pilot blocks (SB #1, #2, #3, #4) of the cell #4.

Similarly, in FIG. 12, four pilot sequences: {C (K−1), C_K, C_1, C_2} are allocated to four pilot blocks (SB #1, #2, #3, #4) of the cell #(K−1), and four pilot sequences: {C_K, C_1, C_2, C_3} are allocated to four pilot blocks (SB #1, #2, #3, #4) of the cell #K.

As such, in the embodiment, different pilot sequences can be sent in different pilot blocks in a frame (SB #1, #2, #3, #4) without decreasing the cell repetition factor for reusing pilot sequences by allocating the pilot sequence allocated to SB #2, SB #3 and SB #4 of a certain base station to SB #1, SB #2 and SB #3 of another base station again. From that, a significant effect in reducing interference of another cell without decreasing the cell repetition factor for reusing a pilot sequence by combining (averaging) a plurality of received pilot blocks at the receiving side in the embodiment.

Figure 13:
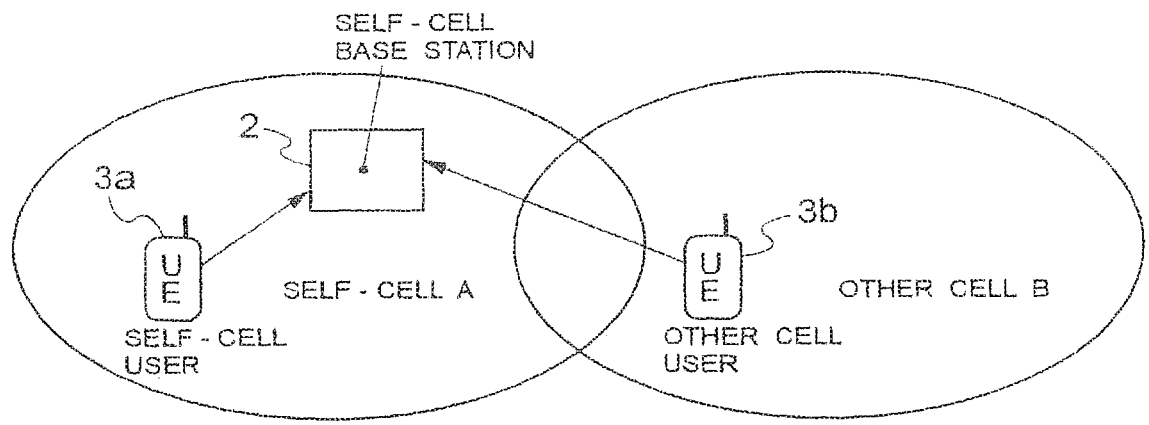
FIG. 13 is a block diagram showing a system model of a simulation relating to the present invention.
Figure 14:
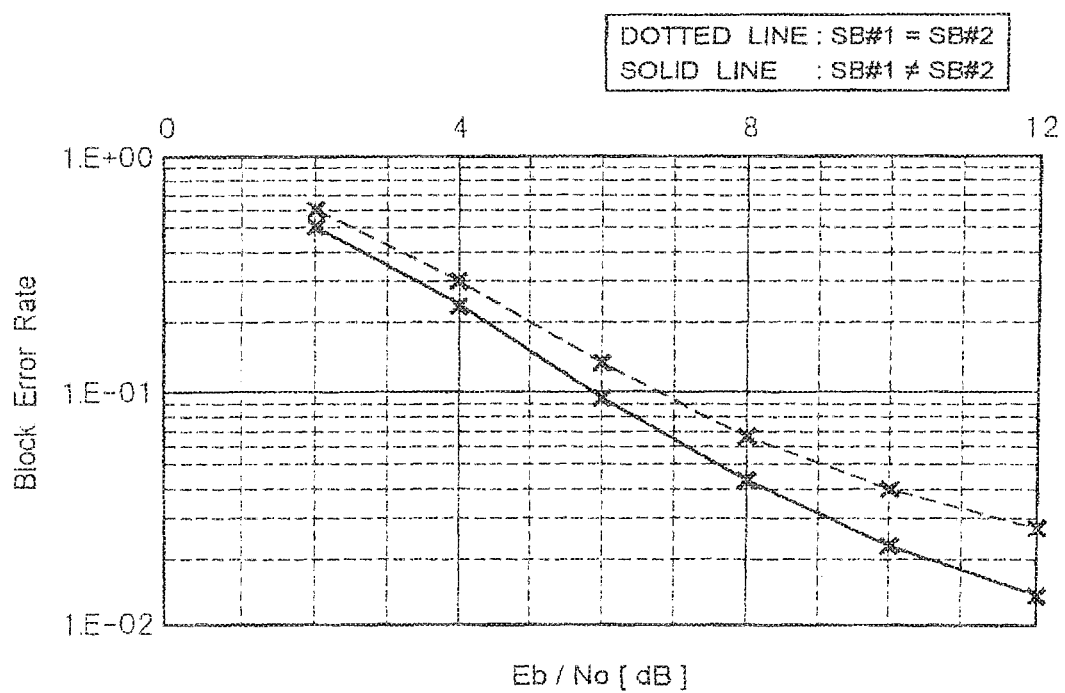
FIG. 14 is a diagram showing a simulation result in the present invention.

FIG. 13 is a block diagram showing a system model of a simulation relating to the present invention. FIG. 14 is a diagram showing a simulation result relating to the present invention. FIGS. 15A to 15C and 16A to 16C are diagrams showing exemplary allocation of pilot sequences to a pilot blocks (SB #1, SB #2) used in a simulation relating to the present invention. FIG. 17 is a diagram showing exemplary parameters used in a simulation relating to the present invention. FIG. 18 is a diagram showing a case where a data signal and a pilot signal are multiplexed in a frequency region of a simulation relating to the present invention. Effects of the present invention will be described with reference to FIGS. 13 to 18.

As shown in FIG. 13, the wireless communication system of a simulation relating the present invention includes two cells of a self-cell A and other cell B. The self-cell A has a self-cell base station 2 and the self-cell user [mobile station (UE) 3a]. The other cell B has the other cell user [mobile station (UE) 3b]. The self-cell base station 2 receives a signal from the self-cell user [mobile station (UE) 3a], and also receives a signal from the other cell user [mobile station (UE) 3b] as interference. Further, in the simulation relating to the present invention, a frame of communication between a base station and a mobile station is assumed to have two pilot blocks SB #1 and SB #2.

FIG. 14 shows block error rate characteristics of a signal that the self-cell base station 2 receives from the self-cell user [mobile station (UE) 3a]. The dotted line shows a result of the case where the same pilot sequence is used in SB #1 and SB #2 [FIG. 15A table #1]. The solid line shows a result of the case where different pilot sequences are used for SB #1 and SB #2 [FIG. 15B table #2].

The simulation relating to the present invention uses Localized FDM for data multiplexing method, and Distributed-FDM pilot [1] (9. 1. 1. 2. 2 Uplink reference-signal structure) for a pilot multiplexing method. It is set SRF (Symbol Repetition Factor) of the pilot=4. Further, an interference user from another cell is set to a user, and the average interference power is set to −6 dB for the average power of the self-cell user, and a frame timing between the self-cell user and the other cell user (interference user) is assumed to be synchronized with.

Further, the pilot sequence uses a sequence described in the abovementioned formula (1) ("k" in the formula is a parameter), the pilot sequence allocation to each user and each SB (allocation of parameter "k") is shown in each of the tables #1 to #6 in FIG. 15A to 15C and FIG. 16A to 16C. For reference, the case of multiplexing data and pilot in a frequency region at this moment is shown in FIG. 18 and parameters used in the simulation are shown in FIG. 17.

As shown in FIG. 14, it is apparent that Eb/No required for meeting the block error rate=$10^{-1}$ is improved by near 1 dB. It is apparent that Eb/No required for meeting the block error rate=$3 \times 10^{-2}$ is improved by 2 dB or more.

It is assumed that the table #2 shown in FIG. 15B shows the abovementioned pilot allocation of the second embodiment of the present invention but the pilot allocation of the third embodiment of the present invention, i.e., allocation in the table #3 shown in FIG. 15C may achieve the same effects. For the pilot allocation of the first embodiment of the present invention [pilot sequence allocation such as the table #4 shown in FIG. 16A], the same effects may be achieved.

As the tables #5 and #6 shown in FIG. 16B, 16C, an effect of reducing the other cell interference can be achieved even if the pilot sequence used in SB #1 is the same as that in the other cell, if the sequence used in SB #2 is different. Similarly, the same effect as that mentioned above can be achieved even if SB #2 uses the same sequence as the adjacent cell, if a sequence different from that of the adjacent cell is used in SB #1. That is to say, if at least one of the pilot sequences allocated to the self-cell is different from at least one of the pilot sequence allocated to the other cell, the same effect can be achieved. This is true in the case where the number of SBs in a frame is three or more.

In the present invention, the cases where the number of pilot blocks in a frame is two or four have been respectively described above. The present invention, however, can be applied to the cases where the number of pilot blocks is five or more as to the cases where the number of blocks is two or four.

What is claimed is:

1. A mobile station comprising:
a processor configured to:
generate a first signal based on a first sequence;
generate a second signal based on a second sequence;
wherein the first sequence and the second sequence are each defined by a formula which comprises:

$Ck(n)=\exp[-(j2\pi k/N)(n(n+1)/2+qn)]$, wherein k in the formula is a parameter, a value of the parameter being based on a cell identity, q in the formula is an arbitrary integer, N in the formula for the first sequence is a length of the first sequence, N in the formula for the second sequence is a length of the second sequence, and n in the formula is a number greater than or equal to 0 and less than or equal to N−1, and
wherein a value of the parameter for the first sequence is different than a value of the parameter for the second sequence; and
a transmitter configured to transmit the first signal in a first portion of a subframe, and transmit the second signal in a second portion of the subframe.

2. The mobile station according to claim 1, wherein the value of the parameter for the first sequence and the value of the parameter for the second sequence are positive integers.

3. The mobile station according to claim 1, wherein the first signal and the second signal are transmitted by single carrier transmission.

4. The mobile station according to claim 1, wherein the first portion and the second portion are different in a time domain.

5. The mobile station according to claim 1, wherein both the length of the first sequence and the length of the second sequence are the same.

6. A method comprising:
generating a first signal based on a first sequence;
generating a second signal based on a second sequence;
wherein the first sequence and the second sequence are each defined by a formula which comprises:

$Ck(n)=\exp[-(j2\pi k/N)(n(n+1)/2+qn)]$, wherein k in the formula is a parameter, a value of the parameter being based on a cell identity, q in the formula is an arbitrary integer, N in the formula for the first sequence is a length of the first sequence, N in the formula for the second sequence is a length of the second sequence, and n in the formula is a number greater than or equal to 0 and less than or equal to N−1, and
wherein a value of the parameter for the first sequence is different than a value of the parameter for the second sequence;
transmitting the first signal in a first portion of a subframe; and
transmitting the second signal in a second portion of the subframe.

7. The method according to claim 6, wherein the value of the parameter for the first sequence and the value of the parameter for the second sequence are positive integers.

8. The method according to claim 6, wherein the first signal and the second signal are transmitted by single carrier transmission.

9. The method according to claim 6, wherein the first portion and the second portion are different in a time domain.

10. The method according to claim 6, wherein both the length of the first sequence and the length of the second sequence are the same.

11. A base station comprising:
a processor; and
a receiver configured to:
receive a first signal in a first portion of a subframe, and receive a second signal in a second portion of the subframe,
wherein the first signal is based on a first sequence and the second signal is based on a second sequence,
wherein the first sequence and the second sequence are each defined by a formula which comprises:

$Ck(n)=\exp[-(j2\pi k/N)(n(n+1)/2+qn)]$, wherein k in the formula is a parameter, a value of the parameter being based on a cell identity, q in the formula is an arbitrary integer, N in the formula for the first sequence is a length of the first sequence, N in the formula for the second sequence is a length of the second sequence, and n in the formula is a number greater than or equal to 0 and less than or equal to N−1, and
wherein a value of the parameter for the first sequence is different than a value of the parameter for the second sequence.

12. The base station according to claim 11, wherein the value of the parameter for the first sequence and the value of the parameter for the second sequence are positive integers.

13. The base station according to claim 11, wherein the first signal and the second signal are transmitted by single carrier transmission.

14. The base station according to claim 11, wherein the first portion and the second portion are different in a time domain.

15. The base station according to claim 11, wherein both the length of the first sequence and the length of the second sequence are the same.

16. A method comprising:
receiving a first signal in a first portion of a subframe; and
receiving a second signal in a second portion of the subframe, wherein the first signal is based on a first sequence and the second signal is based on a second sequence, wherein the first sequence and the second sequence are each defined by a formula which comprises:

$$Ck(n)=\exp[-(j2\pi k/N)(n(n+1)/2+qn)],$$

wherein k in the formula is a parameter, a value of the parameter being based on a cell identity, q in the formula is an arbitrary integer, N in the formula for the first sequence is a length of the first sequence, N in the formula for the second sequence is a length of the second sequence, and n in the formula is a number greater than or equal to 0 and less than or equal to N−1, and wherein a value of the parameter for the first sequence is different than a value of the parameter for the second sequence.

17. The method according to claim 16, wherein the value of the parameter for the first sequence and the value of the parameter for the second sequence are positive integers.

18. The method according to claim 16, wherein the first signal and the second signal are transmitted by single carrier transmission.

19. The method according to claim 16, wherein the first portion and the second portion are different in a time domain.

20. The method according to claim 16, wherein both the length of the first sequence and the length of the second sequence are the same.

* * * * *